United States Patent [19]
Corley et al.

[11] Patent Number: 5,838,683
[45] Date of Patent: Nov. 17, 1998

[54] DISTRIBUTED INTERACTIVE MULTIMEDIA SYSTEM ARCHITECTURE

[75] Inventors: Robert David Corley, Carrollton; Richard A. Dunlap, Euless; Paul S. Hahn, Plano; Michael H. McClung, Dallas; Christopher E. Pearce, Addison, all of Tex.

[73] Assignee: Selsius Systems Inc., Dallas, Tex.

[21] Appl. No.: 402,834

[22] Filed: Mar. 13, 1995

[51] Int. Cl.$^6$ ....................................................... H04J 3/24
[52] U.S. Cl. ........................................... 370/408; 370/216
[58] Field of Search ...................... 370/110.1, 94.1–94.3, 370/60, 60.1, 53, 56, 58.1, 58.2, 85.6, 62, 85.13, 216, 217, 219, 220, 226, 227, 228, 247, 248, 251, 256, 257, 351, 400, 401, 404, 406, 408, 431, 908, 901; 340/825.5, 825.51; 379/202; 371/20.2, 20.1, 20.3

[56] References Cited

U.S. PATENT DOCUMENTS

| | | | |
|---|---|---|---|
| 5,222,120 | 6/1993 | Mcleod et al. | 379/201 |
| 5,265,092 | 11/1993 | Soloway et al. | 370/60 |
| 5,301,303 | 4/1994 | Abraham et al. | 370/85.13 |
| 5,315,586 | 5/1994 | Charvillat | 370/395 |
| 5,436,617 | 7/1995 | Adams et al. | 340/825.4 |
| 5,455,861 | 10/1995 | Faucher et al. | 379/95 |
| 5,490,252 | 2/1996 | Macera et al. | 370/85.13 |
| 5,509,010 | 4/1996 | La Porta et al. | 370/110.1 |
| 5,521,971 | 5/1996 | Key et al. | 379/220 |

*Primary Examiner*—Dang Ton

[57] ABSTRACT

Various aspects of an interactive multimedia system and associated methods. In general, the multimedia system employs central and peripheral hubs that function to provide services to a plurality of clients of a call manager server, or manager subsystem. The hubs and subsystem cooperate to serve requests originating in the plurality of clients. The client-server-client architecture allows for distributed processing and resource management. Redundant connections between the various network subsystems and hubs provide survivability. Each subsystem or hub is provided with the ability to initialize or recover from systemic errors, thereby distributing initialization and recovery. Certain of the distributed resources are capable of being managed from other subsystems, thereby allowing sharing of the resources. An open numbering plan allows efficient call treatment of dialed numbers. Call processing is sharable between multiple manager subsystems. Finally, an iterative process is employed to ensure that calls routed through the network travel the shortest possible path.

98 Claims, 29 Drawing Sheets

SYSTEM MMMan

BLOCK MMMan/Devices

BLOCK MMMan/Devices/Devices/Pri/PriNi2/PriNi2Net

BLOCK MMMan/Devices/Devices/ITrunk

BLOCK MMMan/Devices/Devices/QTrunk

BLOCK MMMan/Devices/Devices/ISTE

BLOCK MMMan/Devices/DeviceInit

BLOCK MMMan/CPControl

BLOCK MMMan/CPControl/DigitAnalysisTest

BLOCK MMMan/MsgTrans

BLOCK MMMan/LinkLayer/Hub

BLOCK MMMan/LinkLayer/Router

BLOCK MMMan/Db/DbInit

DISTRIBUTED INTERACTIVE MULTIMEDIA SYSTEM ARCHITECTURE

CROSS-REFERENCE TO RELATED APPLICATIONS

| Reference | Title | Inventor(s) | Filing Date |
|---|---|---|---|
| U.S. Pat. No. 5,594,732 | BRIDGING AND OUT-OF-BAND SIGNALLING SUBSYSTEMS AND METHODS FOR A MULTIMEDIA SYSTEM | Robert T. Bell, et al. | March 3, 1995 |
| U.S. Pat. No. 5,659,542 | SYSTEM AND METHOD FOR SIGNALLING AND CALL PROCESSING FOR PRIVATE AND HYBRID COMMUNICATIONS SYSTEMS INCLUDING MULTIMEDIA SYSTEMS | Robert T. Bell, et al. | March 3, 1995 |
| U.S. Ser. No. 08/404,191 | MULTIMEDIA CLIENT FOR MULTIMEDIA/HYBRID NETWORK | Ronald D. Higgins, et al. | March 13, 1995 |

The above-listed applications are commonly assigned with the present invention and are incorporated herein by reference as if reproduced herein in their entirety.

TECHNICAL FIELD OF THE INVENTION

The present invention is directed, in general, to communications systems and, more particularly, to a communications system employing a client-server-client architecture, allowing processing, storage and network resources to be distributed among subsystems and hubs of the network.

BACKGROUND OF THE INVENTION

Currently, "information superhighway" and "multimedia" are probably the most often spoken and least often understood aspects of a coming revolution in data communication. Although issues specific to an information superhighway are beyond the scope of the present discussion, interactive multimedia systems are very much within the present scope.

An interactive multimedia system is broadly defined as a system capable of processing, storing, communicating and coordinating data pertaining to visual information, aural information and other information. Visual information is generally divided into still picture or graphics and full motion video or animation categories. In the vernacular of those involved in multimedia, such visual information is generically referred to as "video." Aural information is generally divided into speech and non-speech categories and is generically referred to as "voice." "Other information" is directed primarily to computer data, often organized in files and records, and perhaps constituting textual and graphical data. Such computer data are generally referred to as "data."

To date, multimedia has, for the most part, been limited to stand-alone computer systems or computer systems linked together in a local area network ("LAN"). While such isolated systems have proven popular and entertaining, the true value of multimedia will become apparent only when multimedia-capable wide area networks ("WANs") and protocol systems are developed, standardized and installed that permit truly interactive multimedia. Such multimedia systems will allow long distance communication of useful quantities of coordinated voice, video and data, providing, in effect, a multimedia extension to the voice-only services of the ubiquitous telephone network.

Defining the structure and operation of an interactive multimedia system is a critical first step in the development of such system. Accordingly, before entering into a discussion herein of more specific design issues, it is important to discuss more general questions that need to be resolved concerning design objectives of the system as a whole and some generally agreed-upon answers and specifications.

Interactive multimedia may be thought of as an electronic approximation of the paradigm of interactive group discussion. It involves the interactive exchange of voice, video and data between two or more people through an electronic medium in real time. Because of its interactive and real-time nature, there are some stringent requirements and required services not normally associated with multimedia retrieval systems. Some of the more obvious examples of those requirements and services include latency (transmission delay), conferencing, availability ("up-time") and WAN interoperability.

The evolution of existing private branch exchange ("PBX") and LAN topologies towards a composite interactive multimedia system based upon client-server architectures and isochronous networks is a natural trend. However, to merge the disparate mediums of voice, video and data successfully into a cohesive network requires that three fundamental integration issues be defined and resolved. The first of the fundamental integration issues is quality of service ("QoS"). QoS is defined as the effective communication bandwidth, services and media quality coupling of separate equipment or "terminals" together and the availability ("up-time") of the same. QoS parameters are divided into four groups: 1) terminal QoS, 2) network QoS, 3) system QoS and 4) availability requirements. Thus, QoS parameters must be defined for both terminal equipment ("TE") and network equipment ("NE") governing the communication of data between the TE. System QoS is derived from a combination of terminal and network QoS. The suggested values for QoS parameters are considered to be a practical compromise between required service quality, technology and cost. See, Multimedia Communications Forum ("MMCF") Working Document "Architecture and Network QoS", ARCH/QOS/94-001, Rev. 1.7, MMCF, (September 1994) and ITU-T Recommendation I.350 "General Aspects of Quality of Service and Network Performance in Digital Networks, including Integrated Services Digital Networks ("ISDNs"), (1993). The following Table I summarizes some suggested parameters for terminal QoS.

TABLE I

Terminal QoS Parameters

| Parameter Type | Parameter Value | Parameter Explanation |
|---|---|---|
| Audio Frequency Range | 3.4 kHz | Optimization is for voice, and is consistent with existing Legacy voice systems. |
| Audio Level | −10 dBmO | Optimization is for voice, and is consistent with Legacy voice systems. |
| Audio Encoding | G.711 (8-bit pulse code modulation ("PCM")) | Consistent with Legacy voice systems. |
| Video Resolution | ≧352x288 (SIF) | Minimal acceptable size for video conferencing. |
| Video Frame Rate | ≧20 frames per second (fps) | Minimal optimization for detection of facial expression transitions. |
| Voice/Video Intramedia-Intermedia Differential Delay | <100 milliseconds (ms) | A differential delay greater than 100 ms between voice & video is noticeably significant. |
| Video Encoding | H.261 & Motion Picture Experts Group ("MPEG")-1 | H.261 meets WAN interoperability, MPEG-1 is more consistent with desktop trends and quality requirements. |
| Intramedia Latency (TE) | <100 ms | The delay of the TE itself for encoding and framing purposes. |
| User Data Rate | ≧64 kbps | Minimal acceptable data bandwidth for data sharing applications. Consistent with ISDN Basic Rate Instrument ("BRI"). |
| Data Encoding | High-level Data Link Control ("HDLC") encapsulation | Consistent with isochronous service bearer channels. |

Network QoS parameter requirements consist of those parts of the system that are between two TE endpoints. This includes a portion of the TE itself, the private network (if required) and the public network (if required). Some of the requirements imposed upon the network QoS are a result of the terminal QoS parameters. The following Table II summarizes the network QoS requirements.

TABLE II

Network QoS Parameters

| Parameter Type | Parameter Value | Parameter Explanation |
|---|---|---|
| Intramedia Latency (NE) | <50 ms | Intramedia latency is the delay between source TE transmission and destination TE reception; i.e. the delay of NE. |

TABLE II-continued

Network QoS Parameters

| Parameter Type | Parameter Value | Parameter Explanation |
|---|---|---|
| Network Capacity | ≧1,536 kbps | G.711 Audio (64 kbps), MPEG-1 Video (1,344 kbps), HDLC data (128 kbps). |

The system QoS encompasses the terminal and network elements. The particular value critical to the system is the intramedia latency. The following Table III summarizes this value that is the sum of the terminal and network values for the same parameter.

TABLE III

System QoS Parameters

| Parameter Type | Parameter Value | Parameter Explanation |
|---|---|---|
| Intramedia Latency (System) | <150 ms | Intramedia latency is the delay between source transmission and destination reception. It includes latency imposed by the source and destination TEs as well as the NE. These latency values might include encoding and decoding delays, transmission delays and adaptation delays. |

The system QoS parameter of Intramedia Latency is the sum of twice the TE and the NE latency. Intramedia Latency parameter value is bounded by voice requirements since latent delay is more readily perceived by the ear than the eye. However, the delay itself is typically a function of video since it is the component requiring the most time for encoding and decoding.

Availability ("up-time") includes several aspects. In particular, the network elements have very strict requirements. These requirements are typical of private branch exchanges ("PBXs") and other private network voice equipment, but are very atypical of Legacy LANs. Most LANs are susceptible to power-losses, single points of failure and errant TE. An interactive multimedia system must closely follow the availability requirements of the legacy voice systems. The following Table IV summarizes Availability QoS parameters.

TABLE IV

Availability QoS Parameters

| Parameter Type | Parameter Value | Parameter Explanation |
|---|---|---|
| TE Power Requirements | 5 watts (W) of phantom power (48 volts (V)) | This power requirement is consistent with the ISDN BRI requirements and will allow the least common denominator of voice to function. |
| NE Power | Uninterruptable | NE must be UPS |

TABLE IV-continued

Availability QoS Parameters

| Parameter Type | Parameter Value | Parameter Explanation |
|---|---|---|
| Requirements | power supply ("UPS") | capable including private NE. |
| Single point of failure | 12 Users | No more than 12 users should be impacted by a single point of failure. |
| Error Free Seconds Ratio ("EFS") | >99.9% | Meets requirement of random bit error rate of $10^{-6}$. |

The availability requirements are defined solely within the context of the private network. Additional availability parameters are discussed in G.821. See also, MMCF Working Document "Architecture and Network QOS", ARCH/QOS/94-001, Rev. 1.7, Multimedia Communications Forum, Inc., (September 1994) and TR-TSY-000499, Transport Systems Generic Requirements (TSGR): Common Requirements, Bellcore Technical Reference, Issue 3, (December 1989).

The second of the fundamental integration issues is network services. Network services include transport services, connection management and feature management. Multimedia communication involves the transmission of data having more varied characteristics than video, voice or data in isolation. Therefore, the manner in which the network transports and manages the flow of video, voice and data is critical to the efficiency, flexibility and overall effectiveness of the network.

Transport services can be categorized into three groups: 1) packet, 2) circuit and 3) cell. The following Table V summarizes different aspects of each of these transport services.

TABLE V

Transport Services

| | Packet | Circuit | Cell |
|---|---|---|---|
| Typical technology | Ethernet ®, Token Ring ®, Frame Relay ®, etc. | ISDN, T1 | Asynchronous Transfer Mode ("ATM") |
| Media optimization | Packet data | Isochronous data (voice, video) | Packet & isochronous data |
| Transport optimization | Multicast, shared medium operations | Point-point, full-duplex, low-cost switching | Point-point, full-duplex, high-speed switching |
| Optimized data size | 1500 bytes (Ethernet ®) | 1 byte (voice) | 48 bytes |
| Transport Overhead | 4.2% (64 bytes - IP) | none | 11.3% (6 bytes - AAL1) |
| Transport Methodology | Shared | Switched | Switched |
| Route Methodology | Routing | Signalling (circuit switching) | Signalling (virtual circuit switching) |
| Typical Deployment | Widespread. Deployed as LAN | Widespread. Deployed as both public network and private NE | Very few installations. Typically deployed as private backbone network |

Interactive multimedia requires the usage of an isochronous network because of the QoS requirements for voice and video. While it is possible to construct a packet network with sufficient bandwidth, buffering and intelligence to accommodate synchronous traffic it is considered to be prohibitively expensive and unnecessary. Nevertheless, both the LAN, PBX and WAN require interoperability.

At some point it is expected that the entire private network infrastructure will employ ATM. This will transpire upon the occurrence of several events. First, WANs must adapt to support ATM Points-of-Presence ("POPs"). Second, the telephone must disappear from the premise (replaced by an ATM audio device). Third, packet-based LAN TE must become ATM TE. Fourth, phantom power must be supported to the ATM TE (for availability purposes). Fifth, an 8 kHz synchronous clock must be supported and managed by all ATM equipment. Finally, the price of ATM TE and NE must approach that of Ethernet®, ISDN and isoEthernet® equipment.

Regardless of the interim private network infrastructure, ATM is the only backbone solution for the private network. It is the only scalable switching architecture that can transport packet and isochronous data. Furthermore, because it is deployed as a backbone, the aforementioned issues do not apply.

Connection management is the process employed by the private and public network routing functions. Because packet routing is a well established and defined process, it is not discussed further. Connection management within the confines of an isochronous network for interactive multimedia is a newer technology (albeit with old roots) and deserves discussion.

Signalling for circuit and cell switching is best defined by the ISDN signalling standards (see, TR-NWT-000938, Network Transmission Interface and Performance Specification Supporting Integrated Digital Services Network (ISDN), Bellcore Technical Reference, Issue 1, (August 1990)), isoEthernet® signalling (see, IEEE Proposed Standard 802.9a, "Isochronous services with Carrier Sense Multiple Access with Collision Detection (CSMA/CD) Media Access Control (MAC) service", (December 1994)) and ATM signalling (see, ATM Forum, "ATM User-Network Interface Specification—Version 3.0", (September 1993) and ITU-T Recommendation Q.293x, "Generic Concepts for the Support of Multipoint and Multiconnection Calls"; (1993)). Historically, isochronous networks carry the signalling channel as an isochronous channel. Nevertheless, the signalling function can be shown to be better suited to a packet channel. A hub-routing function is the ideal location to perform the bridging between an isochronous signalling channel and a packet signalling channel. The natural packet protocol choice for a signalling channel is an Internet Protocol ("IETF IP"). Available on most LAN networks, as well as global routing capability, IP greatly enhances the signalling requirement of interactive multimedia.

Feature management consists of the management of those features provided by the private and public network for interactivity purposes. The PBX is followed as a model for interactive multimedia features. The following Table VI summarizes some of the more common features.

TABLE VI

Feature Management

| System Services | User Services | Maintenance |
|---|---|---|
| Account Codes | Buzz Station | Automatic Restart |
| Authorization Codes | Callback | Connection Detail Recording |
| Automatic Number | Call Forward | Default |

TABLE VI-continued

Feature Management

| System Services | User Services | Maintenance |
|---|---|---|
| Identification | | Installation |
| Direct Inward Dialing ("DID") | Call Park | Class of Service |
| Direct Outward Dialing ("DOD") | Call Pickup | Hot Configuration |
| Hunt Groups | Call waiting | |
| Multimedia on hold | Do Not Disturb/Override | |
| Network Numbering Plan | Hold/Consultation Hold | |
| Number Dial Plan | Last Number Redial | |
| Shared Resource Queuing | Multiple/Shared Call Appearances | |
| System Speed Dialing | Conference (multiparty) | |
| Vacant Number Intercept | Transfer | |

The third of the fundamental integration issues is interoperability. An interactive multimedia system by nature implies interoperability, because a multimedia network as envisioned is too large and far-flung to employ the equipment of only a single supplier. Therefore, standards must be established that allow equipment from different suppliers to interact smoothly. To this end, interoperability must extend to transport mechanisms, signalling and compression standards.

There are certain existing communication technologies that must be supported and others that are used. A truly interoperable interactive multimedia system should guarantee that the physical and logical interfaces of each component adheres to a standard. Prior to 1992, this would have been almost impossible. The present day affords the opportunity to evolve the proprietary telephony of the PBX and the proprietary video of the video conferencing systems into standards-based systems in the same manner that the data systems evolved from proprietary mainframes to the standards-based LAN systems of today. The following Table VII summarizes the required standards of interoperability.

TABLE VII

Interoperability Standards

| Transport Standards | Signalling Standards | Compression Standards |
|---|---|---|
| isoEthernet ® (IEEE 802.9a) | ISDN NI-2 | G.711, G.722 (Audio) |
| ATM | QSIG | H.221 (Video) |
| ISDN | Q.2931 | MPEG-1 (Video) |
| | H.320 (Audiovisual) | |

In addition to the standards required for communications, there are other specifications relating to application programming interfaces for terminal and server control. These include Microsoft® Telephony Application Programming Interface ("TAPI®"), Novell® Telephony Service Application Programming Interface ("TSAPI®") and Microsoft® Open DataBase Connectivity ("ODBC®").

Having now set the stage with a discussion of general issues concerning multimedia systems, more specific design issues may now be discussed. The specific design issue of concern is the systemic architecture and network design to implement a truly interactive network-wide multimedia system.

In a traditional telephony environment, the interactivity between the controller and the telephone is defined as a slave-master-slave relationship. In PBX model systems, the PBX is the master or controller for the private operation at a user's premises, and thereby controls the communication system componentry within the user's premises down to the individual telephones or slaves. Consequently, the PBX has absolute control and manages all of the system resources including, but not limited to, call processing and system initialization and recovery. Thus, there is no sharing of resources between componentry in a PBX model system. The concentration of system resources at a central location results in an increasingly complex network as network size increases.

The slave-master-slave architecture of the telephony network is opposite the client-server network used in computer systems. The client-server model refers to a computing system that splits the workload between personal computers ("PCs") and one or more larger computers on the network. In computerese, this is distributed computing, whereby some processing work is done by the client device and some processing work is done by the server device. To date, the client-server architecture has been relegated to computer networks.

Proceeding further into the telephony networks, the PBX is then connected with other PBXs to a central office. The central office is then connected to an interexchange network with trunk-side connections to a higher class office. The hierarchal architecture of the telephony network employs the slave-master-slave relationship throughout. For instance, the central office acts as a master for multiple PBXs, or slaves, within its network. A centralized system, as such, affords operational benefits including the capability to diagnose network trouble, obtain meaningful information, and take corrective measures in a short period of time. However, slave-master-slave networks tend to be very complex to design, implement and maintain.

Furthermore, in systems employing a slave-master-slave architecture, the predominant point of failure is concentrated at the master. For instance, if a PBX handling an automated office, integrating both the voice and data communication in a single system, malfunctions, then the office will suffer an entire network communications black-out. Generally, there are contingency plans associated with such centralized networks to accommodate for a failure. However, the slave-master-slave architecture of typical telephony systems fundamentally suffers because of the lack of distributed and system-wide shared resources, thereby leading to the survivability of the entire system being committed to a single point of failure.

As previously mentioned, the process of system initialization and recovery is controlled by and managed through a central processor in a PBX model system. While this system provides for orderly sequencing of the initialization and recovery system, the system has several drawbacks. First, the operation of the network is dependent upon the central processing engine. Therefore, whole sections of the network may be "down" until the central processor has initialized and recovered the affected section. In a telephony network this is of no moment because full functionality is dependant upon the master. However, in an fully interactive multimedia system where separate channels (e.g. isochronous verses non-isochronous) handle disparate tasks, full telephony functionality is not required for the operation of, for example, a packet-based signalling network.

Secondly, centralized initialization and recovery systems assume a slave-master-slave architecture as opposed to a decentralized architecture. A decentralized architecture, such as a client-server relationship inherent in some computer networks, implicitly defines a loosely coupled relationship between the client and server. When the initialization and recovery system processes are centrally located, a tight coupling is necessarily implemented. For instance, if a transport interface card must be exchanged in a slave device, then a corresponding change in the central processor must also be effected. This inflexibility leads to a scalability concern as the communication network becomes larger and more feature rich.

Similar in nature to system initialization and recovery, the call processing function is performed by a central processing engine in the PBX model system. For instance, if a telephone on PBX I wishes to communicate across the public network to a telephone on PBX II, the call processing function is centrally controlled by PBX I, then by the central office equipment and finally by PBX II. The call processing function is passed along without any collaboration between successive controllers. Stated another way, there are on-going instructions from PBX I to the public network central offices, from the public network central offices to PBX II and from PBX II to the second telephone. In one respect this process seems simple, but the result is that the network is very complex because there is no cooperation between controllers. The telephony network is a system of commands, rather than a cooperation between distributed componentry.

In connection with systemic architecture, there are several ways to construct a database system for networks. In the telephony environment, PBX systems have utilized a single database since they are centrally controlled. This system is advantageous for a couple of reasons, namely, easy access to information and simplicity of database management. Distributed multiple databases have found a home in computer networks whereby processing may be distributed over multiple sites. Obviously, such systems are appropriate when sets of computers are assigned discrete tasks within a LAN, or WAN. In an interactive multimedia network, a centralized network of databases is of concern because of survivability issues, and a distributed network of databases is not acceptable due to database access speed problems.

In addition to systemic architecture, there are other topics related to network design, including call numbering plans and data routing systems, that are critical to communication systems. With respect to call numbering plans, every telephone line in the United States has a unique 10digit address, comprising three divisions. The first division is a three-digit area code, commonly referred to a numbering plan area. Within the area, each central office is assigned at least one three-digit central office code. Within each central office, each customer has a line number between 0000 and 9999. Each central office code, therefore, can support 10,000 lines. In larger cities, it is common for a single switching system to serve multiple central office codes. Worldwide dialing is accommodated through an international direct dialing access code, a country code and the terminating telephone number.

The traditional telephony numbering plan requires interpretation of complex rules of hard-coded digit strings. Modifications to the national or international dialing plans, or to network access codes requires engineers to rewrite digit analysis code. Since accommodating the complex national and international dialing plans makes digit analysis code complex, many PBX manufacturers require their users to configure fixed-length directory numbers. This complex and inflexible numbering plan system is not optimal for an interactive multimedia network.

On the issue of routing information through a network, there are methods of transferring information between PBXs in a telephony environment and methods inherent to routing data between nodes in a LAN. Traditionally, PBX technology has dealt with the transmission of synchronous communications on dedicated isochronous channels. PBX switching functions are normally determined manually by user configurations. Without a large number of nodes in a complex topology, PBXs have not been asked to transmit voice data through a large number of nodes in a highly distributed network.

Conversely, LAN technology has dealt with the transmission of asynchronous data over a non-isochronous medium in a distributed network. Routing in an asynchronous LAN must account for variations in transmission times when selecting a path between nodes in the network. Typically, this results in a solution where multiple packets traverse multiple routes to the final destination and the first arriving packet establishes the fastest route as designated by the routing algorithm. Traditionally, the fastest path routing of the LANs has had no application in the telephony environment.

Accordingly, what is needed in the art to provide a communications network wherein processing, storage and network resources are distributed among subsystems and hubs of the network, allowing the network to be scalable, fault tolerant and flexible.

SUMMARY OF THE INVENTION

To address the above-discussed deficiencies of the prior art, it is a primary object of the present invention to provide a communications network employing a novel, client-server-client architecture.

One aspect of the present invention provides a communications network, comprising: (1) first and second client subsystems, (2) a server subsystem having transport resources associated therewith, (3) a first signalling channel coupling the first client subsystem to the server subsystem and a second signalling channel coupling the second client subsystem to the server subsystem, the first signalling channel allowing the first client subsystem to generate a request to the server subsystem for access to the transport resources of the server subsystem, the server subsystem granting the request only when the transport resources are available, the server subsystem capable of employing the transport resources to initiate a call between the first and second client subsystems and (4) an isochronous user information path capable of being coupled between the first and second client subsystems to convey the call between the first and second client subsystems.

Thus, the present invention introduces the concept of a client-server-client architecture. The client-server-client architecture is fundamentally different from the traditional telephony architecture of a slave-master-slave, because the client is in charge, requesting resources from the server as required. The client-server-client architecture is also fundamentally different from the traditional client-server architecture of computer networks in that, in the network of the present invention, the server exists merely to provide ultimate connectivity between clients for interactive communication therebetween. Thus, the server is merely a means, not an end. In the traditional network, the server is the entity with which the client most often desires communication and is therefore most often the end in itself. Even communication between clients in a traditional computer network is centered about the server.

The client-server-client architecture yields several distinct advantages, among the greatest of which is that processing, storage and network resources can be distributed among the various subsystems or hubs in the network, rather than being focussed in a central master, as in the traditional PBX. By distributing the processing, storage and network resources, the network becomes scalable without incurring undue complexity. Further, the network becomes less prone to failure, as redundancy and distributed initialization and recovery can be employed to minimize single points of failure or downtime, should failure occur.

In a preferred embodiment of this aspect of the present invention, the communications network further comprises a hub having isochronous switching resources associated therewith, the isochronous switching resources capable of coupling the user information path between the first and second client subsystems, the server subsystem generating a request to the hub for access to the isochronous switching resource of the hub, the hub granting the request only when the isochronous switching resources are available. Thus, the concept of distributed resource management is extended to a hub, wherein the hub controls its own resources.

In a preferred embodiment of this aspect of the present invention, the isochronous user information path is adapted to carry multimedia information. Those of skill in the art will understand the advantageous application of the present invention to interactive multimedia systems.

In a preferred embodiment of this aspect of the present invention, the second signalling channel passes through a second server subsystem associated with the second client subsystem. Thus, multiple server subsystems may be employed to manage the network.

In a preferred embodiment of this aspect of the present invention, the communications network further comprises a plurality of hubs coupled to the server subsystem, each of the plurality of hubs having control of associated resources within each of the plurality of hubs, the server subsystem capable of generating a request to a selected one of the plurality of hubs for access to the resources associated with the selected one, the selected one granting the request only when the associated resources are available. In a complete network, it is therefore desirable to distribute resources among a number of hubs. The hubs most often act as servers, responding to requests of the clients.

In a preferred embodiment of this aspect of the present invention, the first client subsystem is capable of initiating a multimedia call through the communications network.

In a preferred embodiment of this aspect of the present invention, the server subsystem comprises a sequence of instructions executable in a general purpose computer system. Those of ordinary skill in the art will understand that a general purpose computer is readily adaptable to perform the functions herein described.

In a preferred embodiment of this aspect of the present invention, the server subsystem further has feature services resources associated therewith, the feature services resources selected from the group consisting of, but not limited to: (1) transfer, (2) conference, (3) hold, (4) drop, (5) record/playback and (6) numbering plan database. These feature services resources will be described hereinafter in detail.

In a preferred embodiment of this aspect of the present invention, the server subsystem further has connectivity services resources associated therewith, the connectivity services resources selected from the group consisting of, but not limited to: (1) point-to-point, (2) point-to-multipoint and (3) multipoint-to-multipoint. These connectivity services will also be described hereinafter in detail.

In a preferred embodiment of this aspect of the present invention, the server subsystem further has media services resources associated therewith, the media services resources selected from the group consisting of, but not limited to: (1) video encode/decode, (2) video record/playback, (3) voice encode/decode, (4) voice record/playback, (5) speech detection and (6) data encode/decode. These media services will be described hereinafter in detail.

Another aspect of the present invention provides a survivable communications network, comprising: (1) first and second manager subsystems, the first and second manager subsystems having first and second equivalent manager subsystem resources associated therewith, respectively, (2) first and second central hubs, each of the first and second central hubs having first and second equivalent central hub resources associated therewith, respectively, (3) a peripheral hub having peripheral hub resources associated therewith, (4) a common bus capable of coupling a selectable one of the first and second central hubs to a selectable one of the first and second manager subsystems, the first central hub thereby capable of decoupling from a failed one of the first and second manager subsystems and coupling instead to an operating one of the first and second manager subsystems, the second central hub thereby capable of decoupling from a failed one of the first and second manager subsystems and coupling instead to a functioning one of the first and second manager subsystems and (5) first and second redundant channels coupling the peripheral hub to the first and second central hubs, respectively, the peripheral hub thereby capable of decoupling from a failed one of the first and second central hubs and coupling instead to a functioning one of the first and second central hubs, the network thereby able to survive failure of a selected one of the first and second manager subsystems and a selected one of the first and second central hubs.

As mentioned previously, it is highly desirable to provide redundancy in the network to avoid single points of failure that render the network vulnerable and therefore unreliable. Thus, each of the hubs and manager subsystems communicates with redundant hubs or subsystems, allowing designation of primary and backup hubs or subsystems.

In a preferred embodiment of this aspect of the present invention, the communications network further comprises a second common bus capable of coupling a selectable one of the first and second central hubs to a selectable one of the first and second manager subsystems, the network thereby able to survive failure of a selected one of the common and second common buses.

In a preferred embodiment of this aspect of the present invention, the first and second central hubs are each provided with a default manager subsystem designation controlling to which of the first and second manager subsystems the first and second central hubs initially couple. The default manager subsystem is therefore the primary subsystem with which the central hubs interact in the absence of failure.

In a preferred embodiment of this aspect of the present invention, the peripheral hub is provided with a default central hub designation controlling to which of the first and second central hubs the peripheral hub initially couples. The default central hub is therefore the primary hub with which the peripheral hub interacts in the absence of failure.

In a preferred embodiment of this aspect of the present invention, the first and second central hubs each have isochronous switching resources associated therewith, the isochronous switching resources capable of coupling a user information path between first and second client subsystems.

In a preferred embodiment of this aspect of the present invention, the communications network further comprises an isochronous user information path coupled to the peripheral hub, the isochronous user information path adapted to carry multimedia information.

In a preferred embodiment of this aspect of the present invention, the communications network further comprises a plurality of peripheral hubs coupled to a selected one of the first and second central hubs, each of the plurality of peripheral hubs having control of associated resources within each of the plurality of peripheral hubs, a selected one of the first and second manager subsystems capable of generating a request to a selected one of the plurality of peripheral hubs for access to the resources associated with the selected one, the selected one granting the request only when the associated resources are available.

In a preferred embodiment of this aspect of the present invention, each of the first and second manager subsystems further has feature services resources associated therewith, the feature services resources selected from the group consisting of, but not limited to: (1) transfer, (2) conference, (3) hold, (4) drop, (5) record/playback and (6) numbering plan database.

In a preferred embodiment of this aspect of the present invention, each of the first and second manager subsystems further has connectivity services resources associated therewith, the connectivity services resources selected from the group consisting of, but not limited to: (1) point-to-point, (2) point-to-multipoint and (3) multipoint-to-multipoint.

In a preferred embodiment of this aspect of the present invention, each of the first and second manager subsystems further has media services resources associated therewith, the media services resources selected from the group consisting of, but not limited to: (1) video encode/decode, (2) video record/playback, (3) voice encode/decode, (4) voice record/playback, (5) speech detection and (6) data encode/decode.

Another aspect of the present invention provides a decentralized communications network, comprising: (1) a first subsystem having first system resources associated therewith and (2) a second subsystem, coupled to the first subsystem and a client device via corresponding ports, the second subsystem having second resources associated therewith and circuitry adapted to execute a second initialization and recovery procedure, the second initialization and recovery procedure initializing components within the second subsystem, testing a functioning of the corresponding ports and placing the second subsystem in an operational condition to make the second resources available to the client device.

Thus, the present invention also provides distributed initialization and recovery. This is in stark contrast to prior art PBX systems, in which a master initialized the entire system, greatly increasing the complexity of the processes that the master was required to perform. This complexity grew almost exponentially as the PBX grew.

In a preferred embodiment of this aspect of the present invention, the second subsystem is capable of notifying the first subsystem of the operational condition. Once initialized or recovered, the subsystem notifies all "upstream" subsystems that its resources are available to the network.

In a preferred embodiment of this aspect of the present invention, the first subsystem further has circuitry adapted to execute a first initialization and recovery procedure, the first initialization and recovery procedure initializing components within the first subsystem, testing a functioning of a port coupling the first subsystem to the second subsystem and placing the first subsystem in an operational condition to make the first resources available to the second subsystem. This will be explained in greater detail.

In a preferred embodiment of this aspect of the present invention, the first subsystem is a manager subsystem and the second subsystem is a central hub. Alternatively, the first subsystem is a central hub and the second subsystem is a peripheral hub.

In a preferred embodiment of this aspect of the present invention, the first and second subsystems each contain independent data processing circuitry adapted to execute the first and second initialization and recovery procedures independently. Thus, the processing required to perform initialization and recovery is provided in each subsystem or hub of the network.

In a preferred embodiment of this aspect of the present invention, the second hub has isochronous switching resources associated therewith, the isochronous switching resources capable of coupling a user information path between the client device and a second client device.

In a preferred embodiment of this aspect of the present invention, the first subsystem further has feature services resources associated therewith, the feature services resources selected from the group consisting of, but not limited to: (1) transfer, (2) conference, (3) hold, (4) drop, (5) record/playback and (6) numbering plan database.

In a preferred embodiment of this aspect of the present invention, the first subsystem further has connectivity services resources associated therewith, the connectivity services resources selected from the group consisting of, but not limited to: (1) point-to-point, (2) point-to-multipoint and (3) multipoint-to-multipoint.

In a preferred embodiment of this aspect of the present invention, the first subsystem further has media services resources associated therewith, the media services resources selected from the group consisting of, but not limited to: (1) video encode/decode, (2) video record/playback, (3) voice encode/decode, (4) voice record/playback, (5) speech detection and (6) data encode/decode.

Another aspect of the present invention provides a communications network, comprising: (1) a first subsystem capable of generating a request to access resources associated with another subsystem coupled thereto and (2) a second subsystem having exclusive and shared resources associated therewith, the second system capable of (a) receiving the request from the first subsystem, (b) granting the request only when the exclusive resources are available if the request involves access to the exclusive resources and (c) allowing the first subsystem to share control of the shared resources with the second subsystem if the request involves access to the shared resources.

Again, a fundamental concept applied throughout the network of the present invention is that of distributed resource management; that is, that each device has control over the allocation of its resources. Sometimes, however, it makes greater sense to allow other devices to contend for one device's resources, particularly in cases involving three or more clients. One example of the desirability of such contention is conference calling. In conference calling, it is advantageous for the device initiating a conference call to request the resource from a shared resource pool of conference bridges, a resource nominally belonging to a hub of the network. By allowing the conference bridge to remain in the hub, the resulting conference call can remain in place, even though the initiating device has disconnected from the call.

In a preferred embodiment of this aspect of the present invention, the first subsystem is a client device and the second subsystem is a hub of the network. In an alternative embodiment, the first subsystem is a hub and the second subsystem is a manager subsystem of the network.

In a preferred embodiment of this aspect of the present invention, the first subsystem is capable of initiating an allocation of the shared resources to a particular task, the shared resources remaining allocated to the particular task if the first subsystem relinquishes control of the shared resources. Again, this speaks to the conference call example given above.

In a preferred embodiment of this aspect of the present invention, the communications network further comprises a manager subsystem, a central hub and a plurality of peripheral hubs, selected ones of which containing the exclusive and shared resources.

In a preferred embodiment of this aspect of the present invention, the second subsystem has isochronous switching resources associated therewith, the second subsystem capable of coupling a user information path between first and second client devices with the isochronous switching resources.

In a preferred embodiment of this aspect of the present invention, the second subsystem further has feature services resources associated therewith, the feature services resources selected from the group consisting of, but not limited to: (1) transfer, (2) conference, (3) hold, (4) drop, (5) record/playback and (6) numbering plan database.

In a preferred embodiment of this aspect of the present invention, the second subsystem further has connectivity services resources associated therewith, the connectivity services resources selected from the group consisting of, but not limited to: (1) point-to-point, (2) point-to-multipoint and (3) multipoint-to-multipoint.

In a preferred embodiment of this aspect of the present invention, the second subsystem further has media services resources associated therewith, the media services resources selected from the group consisting of, but not limited to: (1) video encode/decode, (2) video record/playback, (3) voice encode/decode, (4) voice record/playback, (5) speech detection and (6) data encode/decode.

Another aspect of the present invention provides a communications system, comprising: (1) a calling device capable of generating a dialed number representing a device to be called and (2) a subsystem coupled to the first device and containing a list of dialing patterns and corresponding call treatments arranged in a predetermined order, the subsystem capable of (a) receiving the dialed number from the calling device, (b) comparing the dialed number to each of the dialing patterns in order and, (c) if the dialed number matches a particular dialing pattern, applying a particular corresponding call treatment in response to receipt of the dialed number.

Thus, the present invention provides what may be termed an "open dialing plan," wherein flexible, generic patterns govern the parsing of numbers dialed, allowing sets of numbers to be treated alike.

In a preferred embodiment of this aspect of the present invention, the dialing pattern comprises a string of matching symbols, the matching symbols individually representing a selected one of specific numbers and groups of numbers.

In a preferred embodiment of this aspect of the present invention, the dialing pattern contains matching symbols selected from the group consisting of, but not limited to: (1) matching symbols that match a specific dialed digit, (2) matching symbols that match exactly one of a set of dialed digits and (3) matching symbols that match any quantity of any dialed digits.

In a preferred embodiment of this aspect of the present invention, the dialing pattern contains a formatting symbol.

In a preferred embodiment of this aspect of the present invention, the call treatment is selected from the group consisting of, but not limited to: (1) a dial call treatment indicating that a call represented by the dialed number should be extended to the device to be called, (2) a block call treatment indicating that the call should be rejected and (3) a wait call treatment indicating that the calling device should generate further digits before recomparing the dialed number, including the further digits, with each of the dialing patterns in order.

In a preferred embodiment of this aspect of the present invention, the predetermined order of the dialing patterns in the list is a function of degree of restriction of each of the dialing patterns, wherein a more restrictive dialing pattern precedes a less restrictive dialing pattern in the list.

In a preferred embodiment of this aspect of the present invention, if the dialed number fails to matches any of the dialing patterns in the list, the subsystem applies a block call treatment indicating that a call represented by the dialed number should be rejected.

In a preferred embodiment of this aspect of the present invention, if the dialed number matches a plurality of the dialing patterns, the subsystem applies a call treatment corresponding to a more restrictive of the plurality of the dialing patterns.

In a preferred embodiment of this aspect of the present invention, the device to be called is within the communications system.

In a preferred embodiment of this aspect of the present invention, the subsystem is embodied in a sequence of instructions executable in a general purpose computer system.

Another aspect of the present invention provides a communications network, comprising: (1) first and second manager subsystems having associated first and second call processing resources, respectively, and (2) a first device coupled to the first manager subsystem and capable of obtaining access to the first call processing services of the first manager subsystem to initiate a call to a second device coupled to the second manager subsystem, the first manager subsystem creating a process for completing the call, the first manager subsystem communicating the process to second manager subsystem to create the process in the second manager subsystem, the first and second manager subsystems cooperating to provide call processing services to attempt to complete the call from the first device to the second device, the call processing services thereby distributed between the first and second manager subsystems.

Thus, the present invention introduces the concept of distributed call processing, wherein more than one physical call-processing entity (such as the manager subsystem) may be involved in the processing of a call in a seamless fashion. This is effected by launching duplicate call processes in the separate call-processing entities.

In a preferred embodiment of this aspect of the present invention, a first signalling channel couples the first device to the first manager subsystem and a second signalling channel couples the second device to the second manager subsystem, the first signalling channel allowing the first device to generate a request to the first manager subsystem for access to the call processing resources of the first manager subsystem, the first manager subsystem granting the request only when the call processing resources are determined to be available, the first manager subsystem capable of employing the call processing resources to initiate the call.

In a preferred embodiment of this aspect of the present invention, an isochronous user information path is capable of being coupled between the first and second devices to convey the call between the first and second devices.

In a preferred embodiment of this aspect of the present invention, a single replicated object-oriented database provides an environment for loosely coupling distributed call processing elements into an apparent single network whole.

In a preferred embodiment of this aspect of the present invention, the first and second manager subsystems communicate across a private network partition.

In a preferred embodiment of this aspect of the present invention, the first device is capable of initiating a multimedia call through the communications network.

In a preferred embodiment of this aspect of the present invention, the first manager subsystem comprises a sequence of instructions executable in a general purpose computer system.

In a preferred embodiment of this aspect of the present invention, the first manager subsystem further has feature services resources associated therewith, the feature services resources selected from the group consisting of, but not limited to: (1) transfer, (2) conference, (3) hold, (4) drop, (5) record/playback and (6) numbering plan database.

In a preferred embodiment of this aspect of the present invention, the first manager subsystem further has connectivity services resources associated therewith, the connectivity services resources selected from the group consisting of, but not limited to: (1) point-to-point, (2) point-to-multipoint and (3) multipoint-to-multipoint.

In a preferred embodiment of this aspect of the present invention, the first manager subsystem further has media services resources associated therewith, the media services resources selected from the group consisting of, but not limited to: (1) video encode/decode, (2) video record/playback, (3) voice encode/decode, (4) voice record/playback, (5) speech detection and (6) data encode/decode.

Another aspect of the present invention provides, in a communications network having a plurality of distributed nodes coupled together by a web of synchronous communication path segments having substantially equivalent transmission delays associated therewith, a system for routing a call from a source node to a destination node along a shortest path through the communications network, comprising: (1) a first intermediate node for receiving a request from the source node for a path across the communications network to the destination node, the first intermediate node retrieving first data from a first intermediate database associated with the first intermediate node, the first data representing the shortest path, and forwarding the request through the communications network as a function of the first data and (2) a subsequent intermediate node for receiving the request from the first intermediate node for the path across the communications network to the destination node, the subsequent intermediate node retrieving subsequent data from a subsequent intermediate database associated with the subsequent intermediate node, the subsequent data representing the shortest path, and forwarding the request through the communications network as a function of the data.

It is important to route signalling through the communications network in as efficient manner as possible. Therefore, the present invention provides a database containing the shortest paths through the network. As each node receives a request to be delivered to the destination node, the node determines the shortest path to the destination node and relays the request to the next node in the shortest path. Rather than transmit the shortest path data along with the request, the next node simply looks up the shortest path again, forwarding the request accordingly.

Of course, once the signalling required to establish the call between the source and destination nodes is complete, an isochronous user information path is then established along the same shortest path to carry substantive user information. This may be thought of as "blazing the trail" with signalling along a D channel, for example, and following the trail with user information along a subsequently-established B channel, for example. Thus, the shortest path call routing procedure of the present invention provides benefits both with respect to signalling and subsequent circuit connection.

Because communications systems are synchronous and network elements have fixed delays, the shortest path is statically deterministic. This is as opposed to packet routing networks, wherein packet routing methodologies are based on dynamically deterministic shortest paths.

Although the method of routing according to the present invention seems complex, as the network grows, the method does not grow in complexity. Other, seemingly simple routing methods grow almost exponentially in complexity as a function of network size.

In a preferred embodiment of this aspect of the present invention, the first and intermediate data are created during an initialization of the communications network. Therefore, the database is determined a priori.

In a preferred embodiment of this aspect of the present invention, an isochronous user information path is capable of being coupled between the source and destination nodes to convey information between the first and second nodes.

In a preferred embodiment of this aspect of the present invention, the first and subsequent intermediate databases are replications of a single object-oriented database. The single object-oriented database provides the environment for many of the distributed functions of the network of the present invention.

In a preferred embodiment of this aspect of the present invention, the first and subsequent intermediate nodes communicate across a private network partition.

In a preferred embodiment of this aspect of the present invention, the source node is capable of initiating a multimedia call through the communications network.

In a preferred embodiment of this aspect of the present invention, the first intermediate node comprises a sequence of instructions executable in a general purpose computer system.

In a preferred embodiment of this aspect of the present invention, the first intermediate node further has feature services resources associated therewith, the feature services resources selected from the group consisting of, but not limited to: (1) transfer, (2) conference, (3) hold, (4) drop, (5) record/playback and (6) numbering plan database.

In a preferred embodiment of this aspect of the present invention, the first intermediate node further has connectivity services resources associated therewith, the connectivity services resources selected from the group consisting of, but not limited to: (1) point-to-point, (2) point-to-multipoint and (3) multipoint-to-multipoint.

In a preferred embodiment of this aspect of the present invention, the first intermediate node further has media services resources associated therewith, the media services resources selected from the group consisting of, but not limited to: (1) video encode/decode, (2) video record/ playback, (3) voice encode/decode, (4) voice record/ playback, (5) speech detection and (6) data encode/decode.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
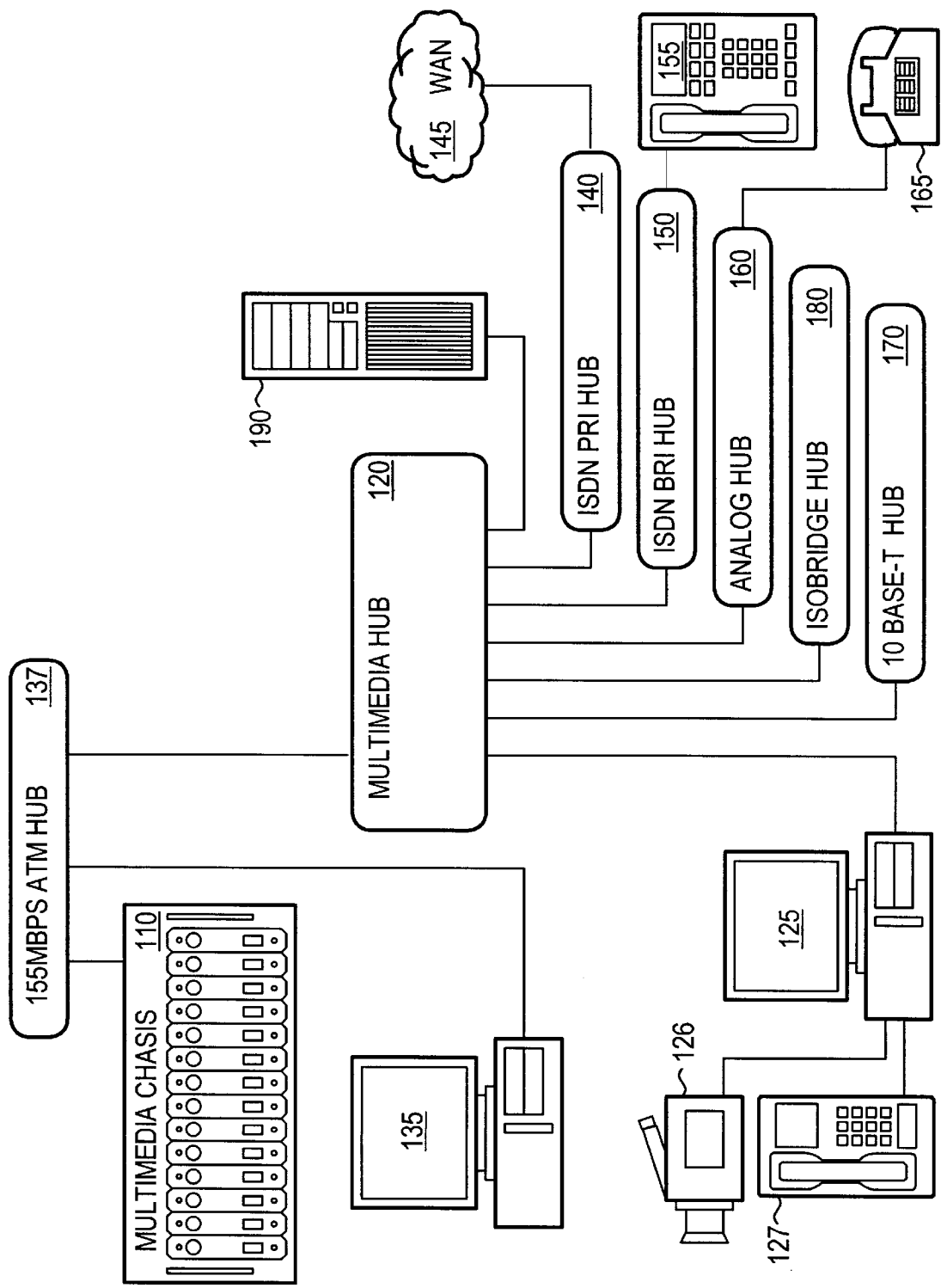
FIG. 1 illustrates a system diagram of an interactive multimedia system according to the present invention.

Referring initially to FIG. 1, illustrated is a system diagram of an interactive multimedia system according to the present invention.

The system, generally designated 100, may comprise a multimedia chassis 110 adapted to receive a plurality of cards therein. The system 100 may alternatively or additionally comprise a plurality of hubs in separate chassis. In the latter case, each of the hubs would contain one of the cards otherwise located in the multimedia chassis 110. Because the hubs are separate from each other, the following discussion will be directed to hubs, as opposed to cards, in the multimedia chassis 110, although it should be understood that the hubs can as easily exist as cards within the multimedia chassis 110.

A multimedia hub 120 forms a principal component of the system 100. In the illustrated embodiment, the multimedia hub 120 contains the following functions: 10Base-T hub repeater, B channel switch, isoEthernet® interfaces (allowing a subordinate device such as a multimedia PC 125, including an associated video camera 126 and telephone instrument 127, to be coupled thereto), encapsulated D channel over IP bridge, encapsulated IP over D channel bridge, tone plant, digital signal processing ("DSP") functions (such as a conference bridge, tone detection, call progress detection, multimedia record/playback and a music interface) and a System Network Management Protocol ("SNMP") agent. Thus, it is readily apparent that most of the system 100 functions involving translation or bridging among standards is handled in the multimedia hub 120.

An ATM hub 137 provides bridging between the multimedia chassis 110 and/or one or more multimedia hubs 120. This allows the system 100 to interface with an ATM backbone. The ATM hub 137 preferably contains 16 155 Mbps OC-3c ATM interfaces. Thus, the ATM hub 137 can be connected to as many as 16 multimedia hubs 120 or non-multimedia PCs 135. The ATM hub 137 may interface to an ATM backbone (not shown) via a higher rate OC-x ATM hub 137.

An ISDN Primary Rate Instrument ("PRI") hub 140 provides a bridge to a WAN 145 through multiple ISDN T1 or E1 Primary Rate interfaces. The ISDN PRI hub 140 contains two isoEthernet® interfaces. This provides redundant connections between the ISDN PRI hub 140 and the multimedia hub 120.

An ISDN BRI hub 150 provides a bridge for ISDN BRI telephone instruments and interfaces 155. A workstation (not shown) may therefore control its telephone via Ethernet®. The ISDN BRI hub 150 is capable of associating the workstation with its corresponding telephone since the ISDN BRI hub 150 has access to both Ethernet® and D channel signalling. The ISDN BRI hub 150 appears as the network end to the ISDN BRI instruments and interfaces 155 and supports NI-2 compatible BRI instruments only.

The ISDN BRI hub 150 contains between 12 and 24 BRI interfaces. As with the ISDN PRI hub 140, the ISDN BRI hub 150 contains two isoEthernet® interfaces. This provides redundant connections between the ISDN BRI hub 150 and the multimedia hub 120.

An analog telephony hub 160 provides connectivity for Plain Old Telephone Sets ("POTS") 165. The analog telephony hub contains coder/decoders ("CODECs") and DSP functionality. Consequently, the POTS 165 appear to the system 100 as BRI sets. Furthermore, a workstation (not shown) may control its POTS 165 via Ethernet®. The analog telephony hub 160 is capable of associating the workstation with its corresponding telephone since the analog telephony hub 160 has access to both Ethernet® and D channel signalling. The analog telephony hub 160 contains 12–24 analog ports. Again, as with the ISDN PRI hub 140 and the ISDN BRI hub 150, the analog telephony hub 160 contains two isoEthernet® interfaces. This provides redundant connections between the analog telephony hub 160 and the multimedia hub 120.

A 10Base-T hub 170 provides 24 SNMP-managed 10 Base-T ports. The 10Base-T hub 170 further provides an Ethernet® AU interface and a single 10Base-F network interface.

An isoBridge hub 180 provides a bridging function between an isochronous network and a packet network. The isoBridge hub 180 is typically used in work-at-home applications wherein an end station is communicating via a fax/modem or ISDN BRI interface through an isochronous WAN into a packet-based Ethernet®. The isoBridge hub 180 performs the conversion of data and HDLC data to and from Ethernet® packets. The isoBridge hub 180 contains no station interface but does contain two isoEthernet® network interfaces.

Within the context of FIG. 1, the multimedia hub 120 is a central hub and the other hubs (e.g. PRI hub 140) are peripheral hubs.

A multimedia manager 190 is coupled to the multimedia hub 120. The multimedia manager performs a variety of connection management services (such as: point-to-point, point-to-multipoint and multipoint-to-multipoint), feature management services (such as: transfer, conference, hold, drop, record/playback and numbering plan database), media services (such as: video encode/decode, video record/playback, voice encode/decode, voice record/playback, speech detection and data encode/decode) and system management functions. The multimedia manager is preferably comprised of software executing on widely-available platforms, such as Intel, MIPS and Digital Equipment Corporation (DEC) Alpha® servers. The operating system of choice is Microsoft® Windows® NT Server, adapted to execute on the above-listed servers.

Given this flexible platform, the multimedia manager 190 is capable of the following features: preemptive multitasking, symmetric multi-processing ("SMP"), security, executing virtual device drivers, multiple packet network stacks (such as TCP/IP and IPX), reliability (redundant array of inexpensive disks ("RAID"), for instance), multiple languages and SNMP management. The multimedia manager 190 further contains a management function, effected in the illustrated embodiment by Hewlett-Packard's OpenView® and an object-oriented database.

The interactive multimedia system 100 advantageously employs a client-server-client architecture. Within this architecture, server applications (particularly executing in the multimedia manager 190) provide services to the clients (e.g. the desktops) and are loosely coupled with client applications and network hardware. The client requests services from the server including, but not limited to, transport services, connectivity services, feature services and media services. With these services the client can support a wide variety of user applications. The components within the client-server-client are interrelated and coupled through set signalling standards, transport services and server applications. This philosophy permits open, independent development of services at both the server and client nodes. It also inherently implies a peer network of application servers, promoting linear scalability.

The client-server-client architecture is generally implemented as follows. The multimedia manager 190 operates in both a client and a server mode. It is a client in the sense that it requests services from the different hubs (e.g., a bridge to the WAN 145 through the ISDN PRI hub 140), and it is a server to the subordinate devices 125 and to the telephone devices directly coupled to a hub (e.g. ISDN BRI telephone instruments and interfaces 155 bridged through the ISDN BRI hub 150).

The hubs generally act as servers in the present model. For instance, the analog telephony hub 160 provides connectivity for the POTS 165. Finally, the endpoints in the multimedia system 100, such as the subordinate devices 125, ISDN BRI telephone instruments and interfaces 155, and the POTS 165, are clients in the present model. It is appreciated that the examples of the client-server-client architecture as discussed with respect to the multimedia manager, hubs and endpoints are illustrative only and other implementations of the architecture as applied to the interactive multimedia system 100 are within the scope of the present invention.

Figure 2A:
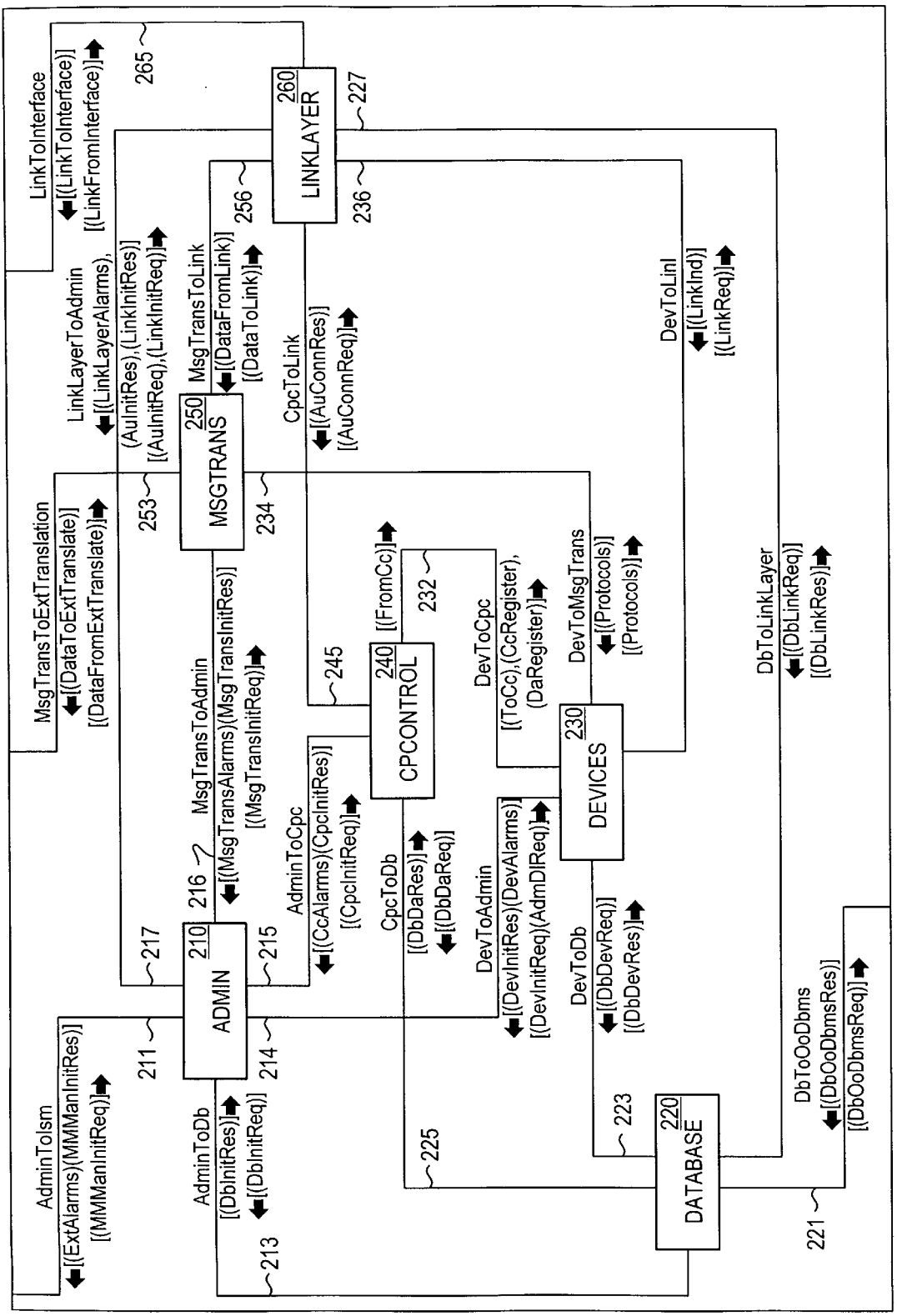
FIGS. 2A–2CC, taken in conjunction, illustrate block diagrams in specification design language ("SDL") for a multimedia manager subsystem according to the present invention.
Figure 2B:
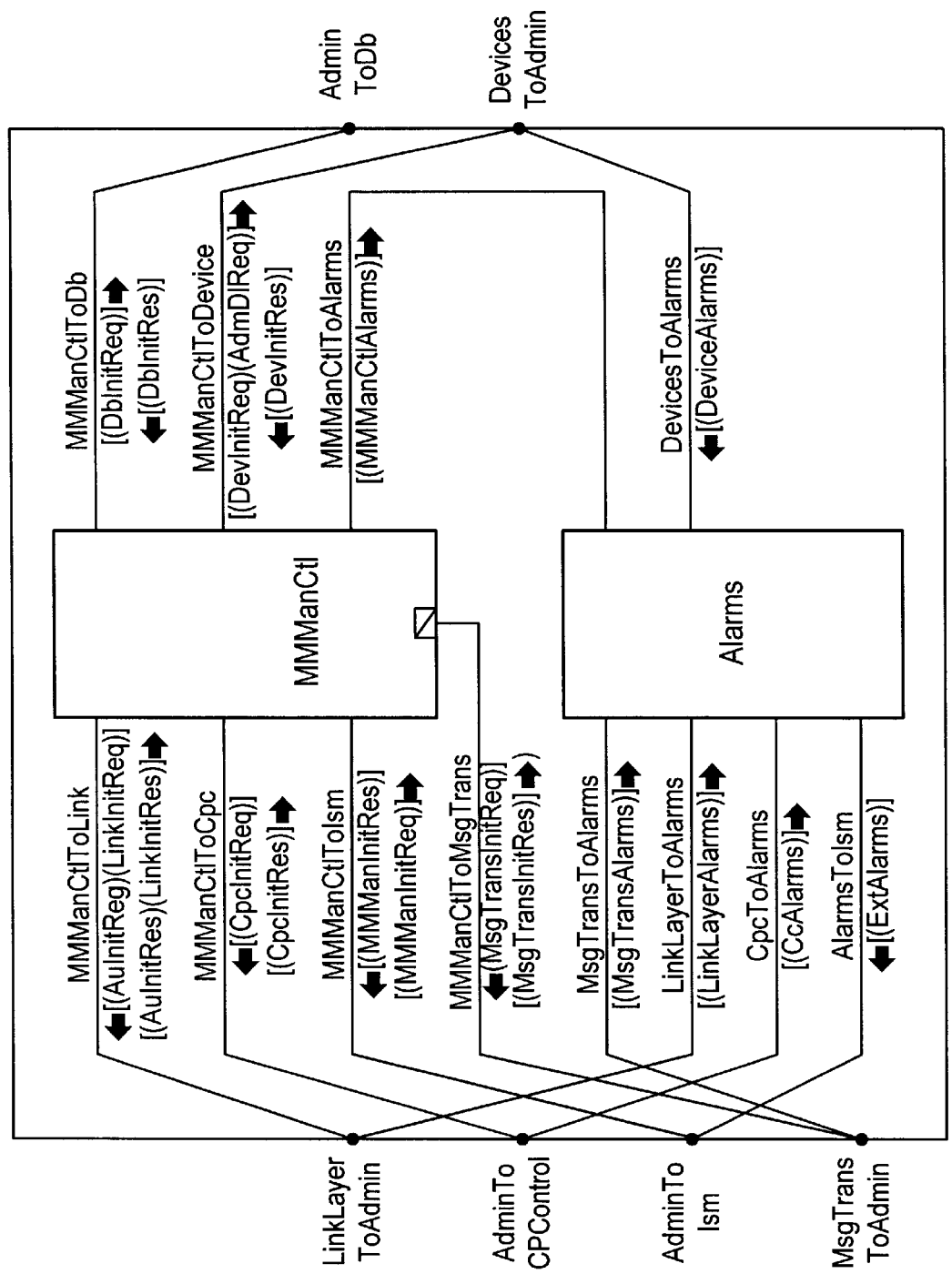
Figure 2C:
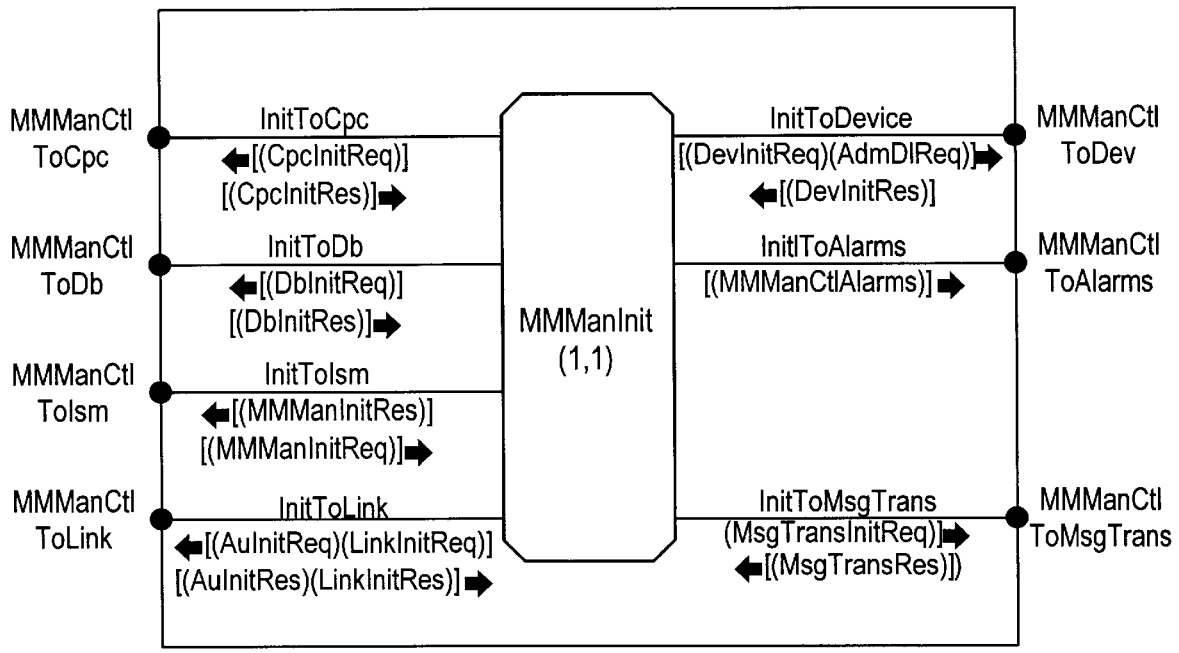
Figure 2D:
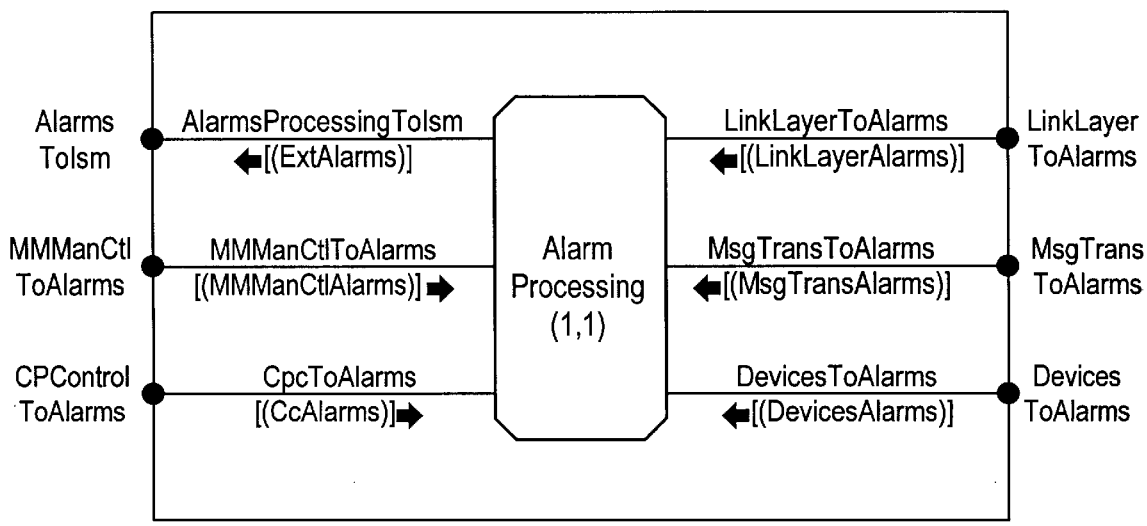
Figure 2E:
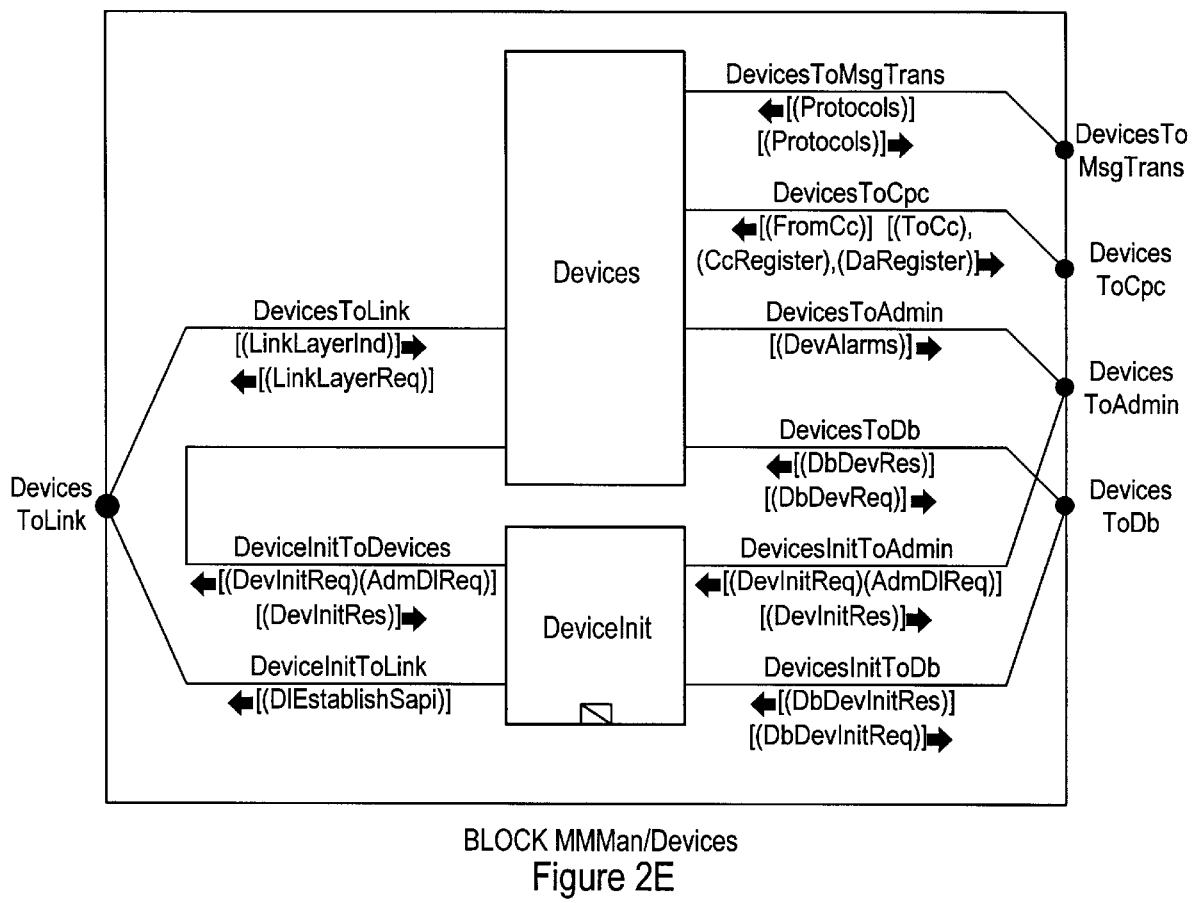
Figure 2F:
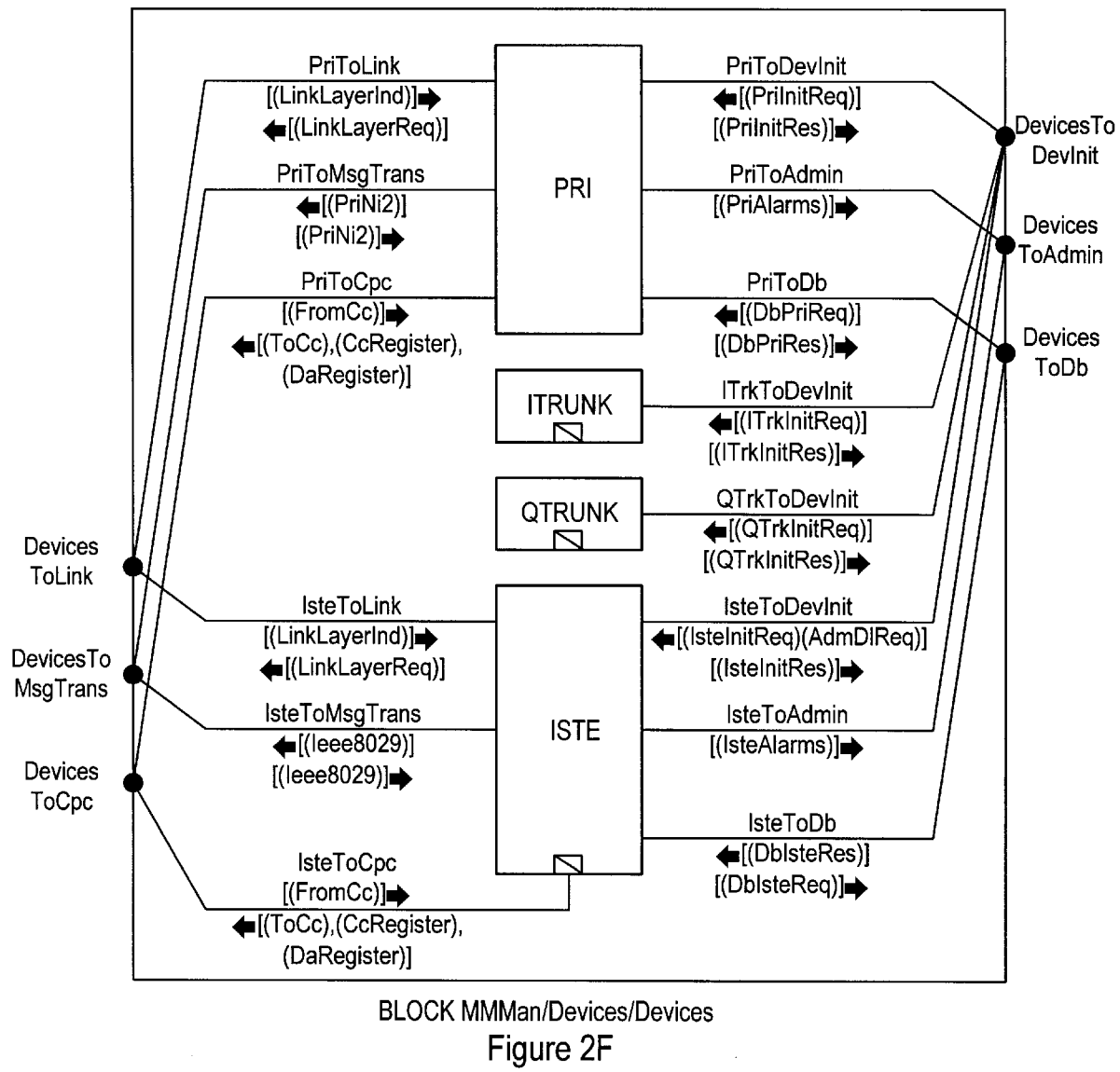
Figure 2G:
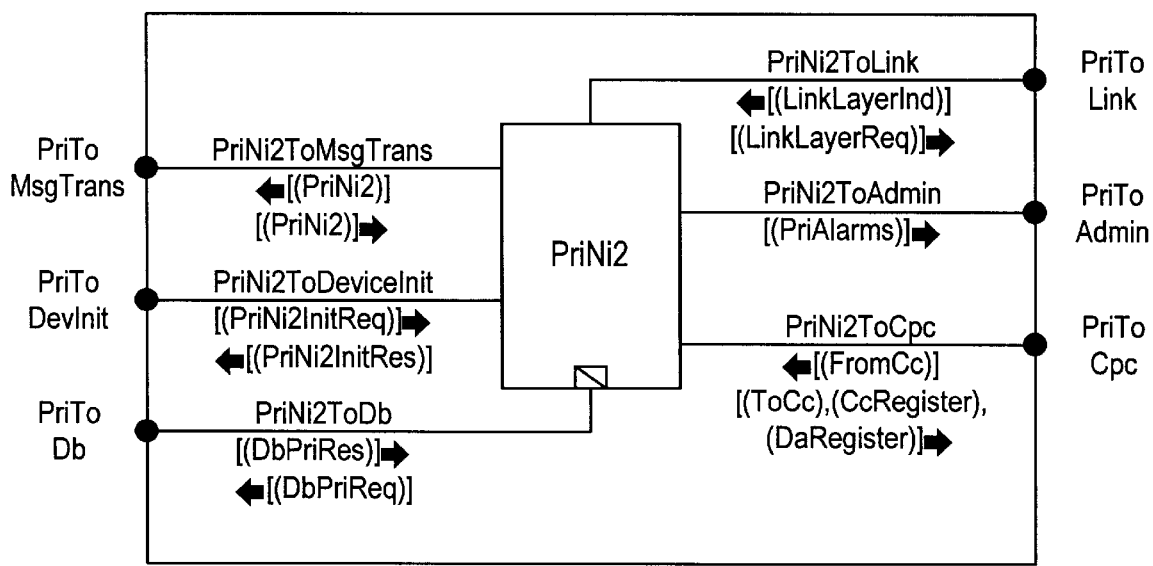
Figure 2H:
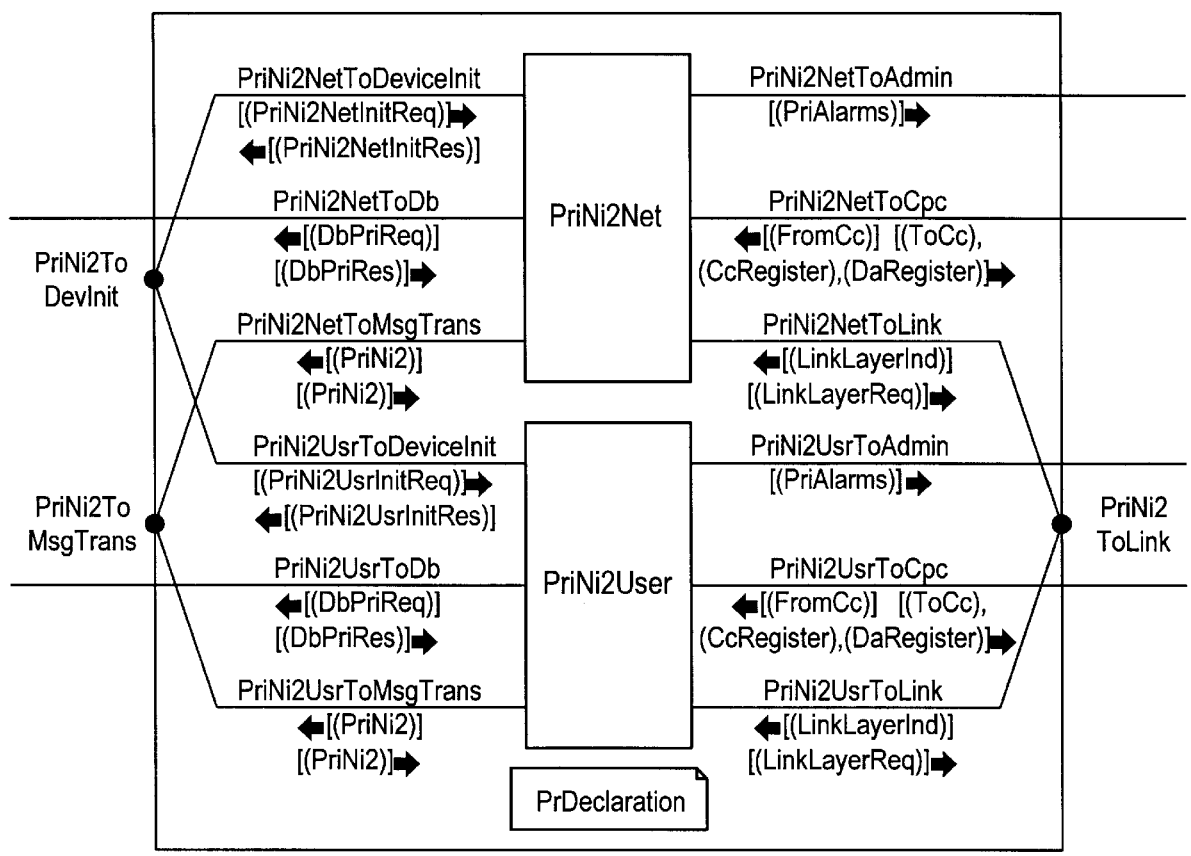
Figure 21:
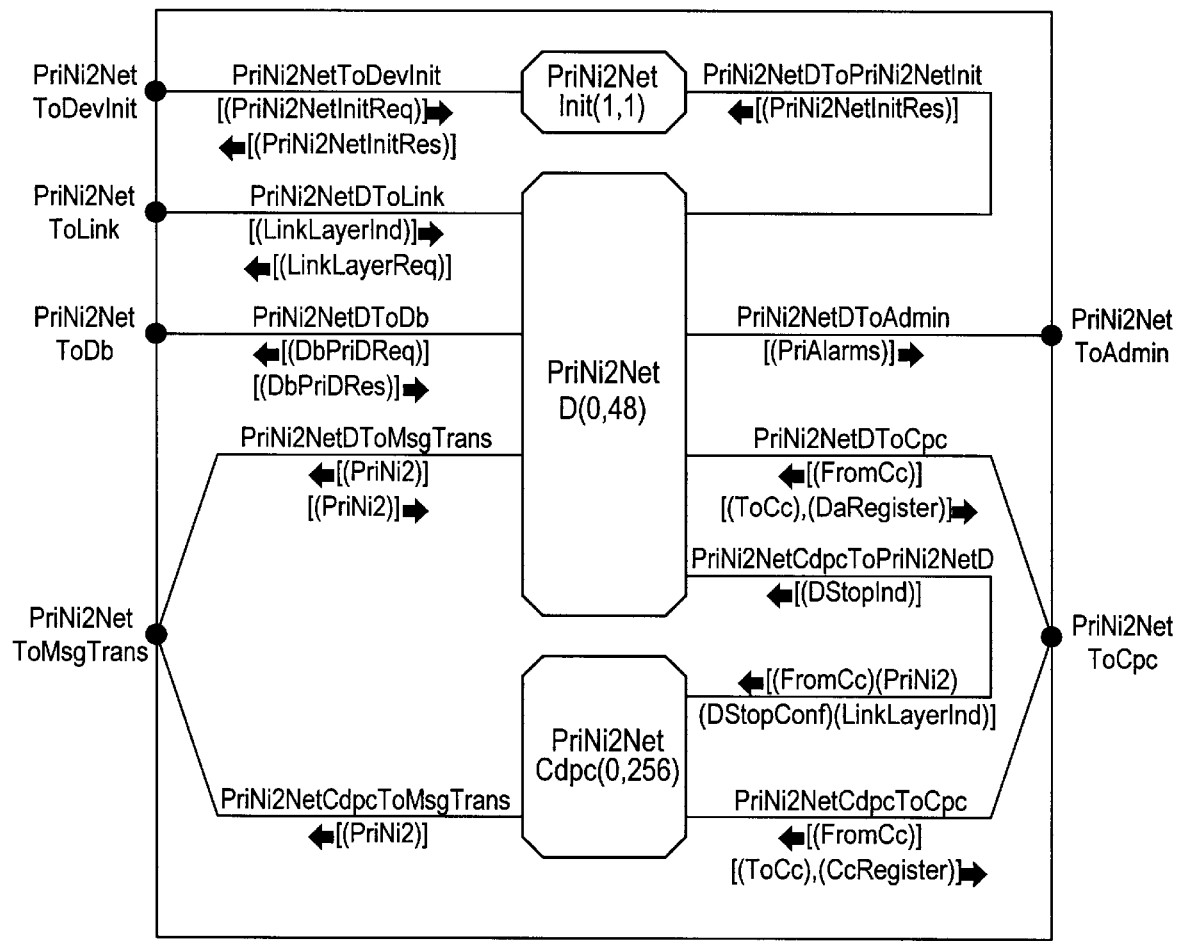
Figure 2J:
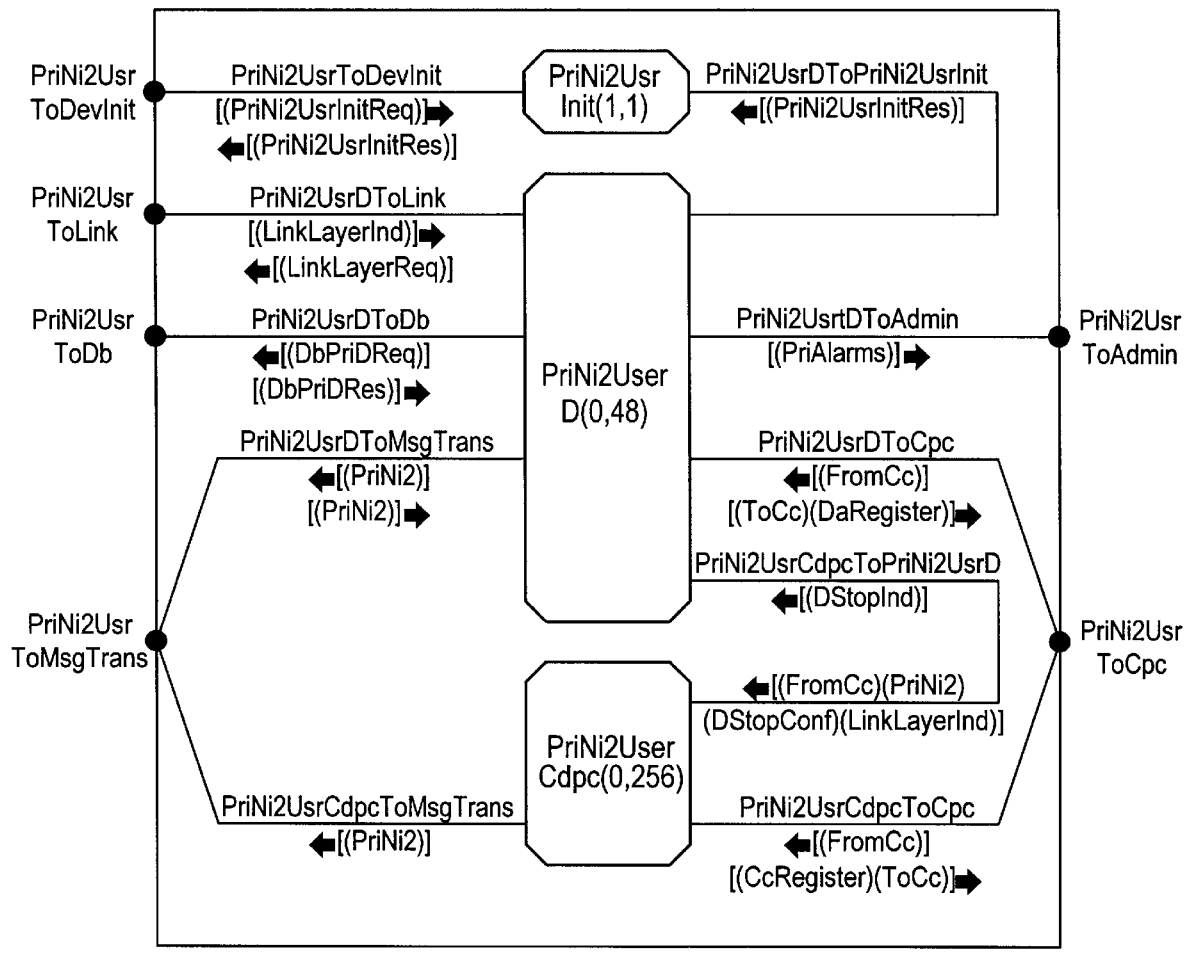
Figure 2K:
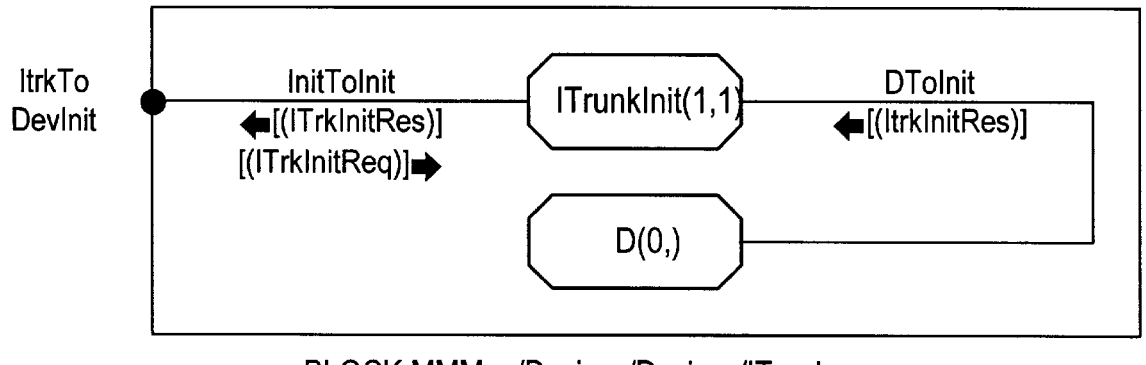
Figure 2L:
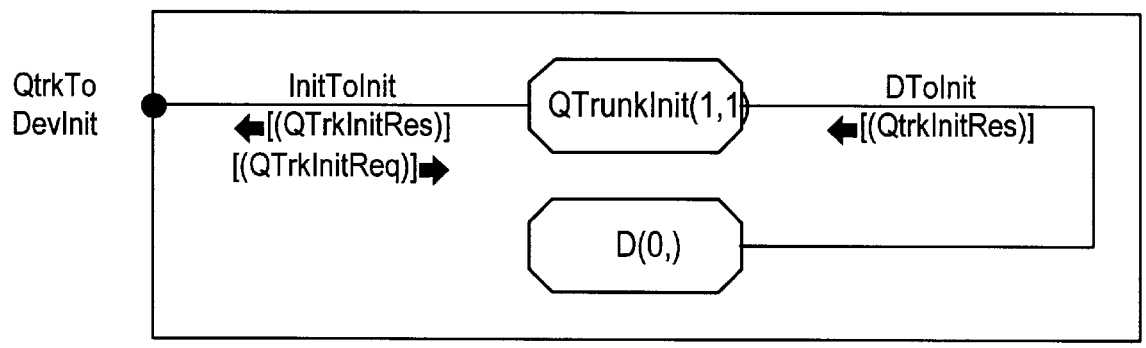
Figure 2M:
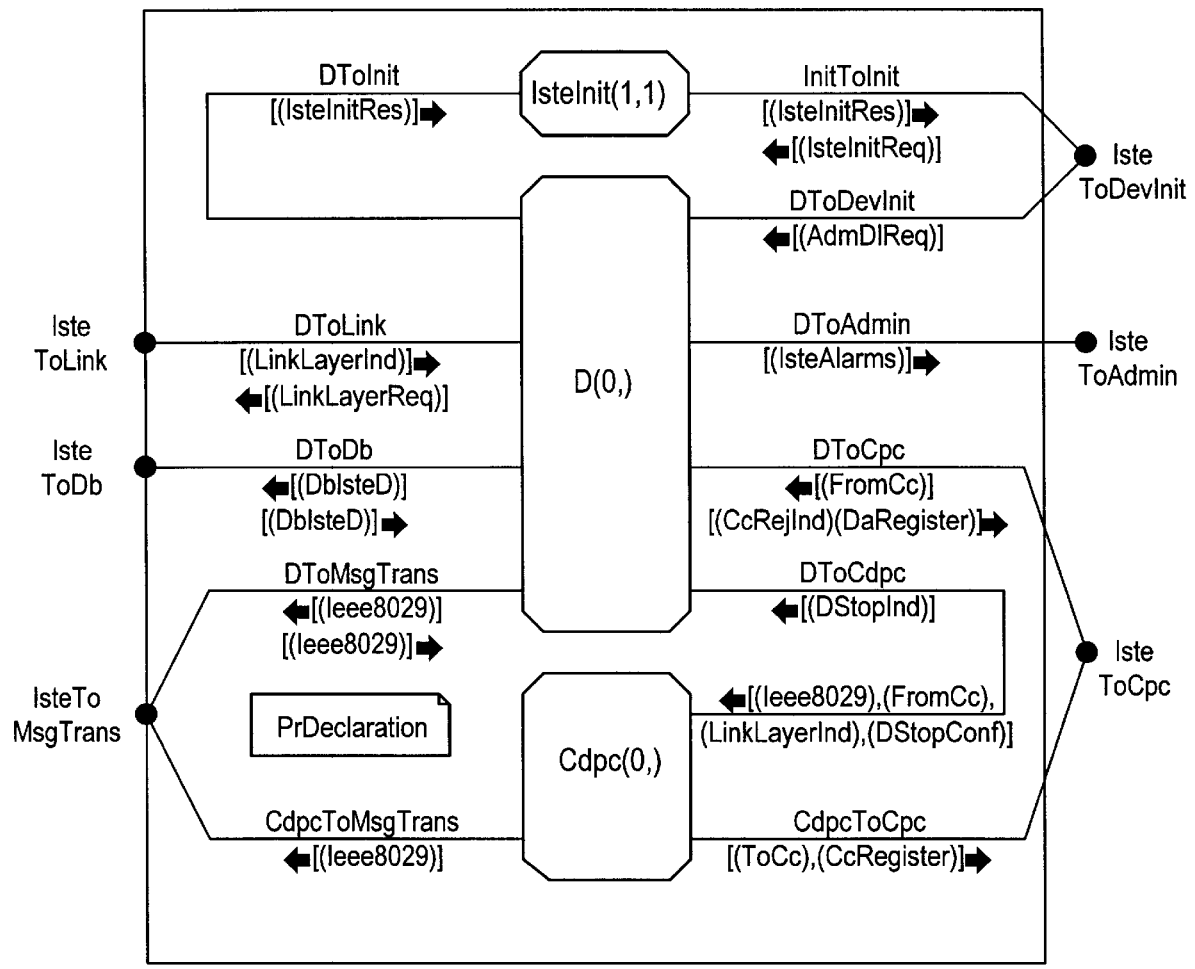
Figure 2N:
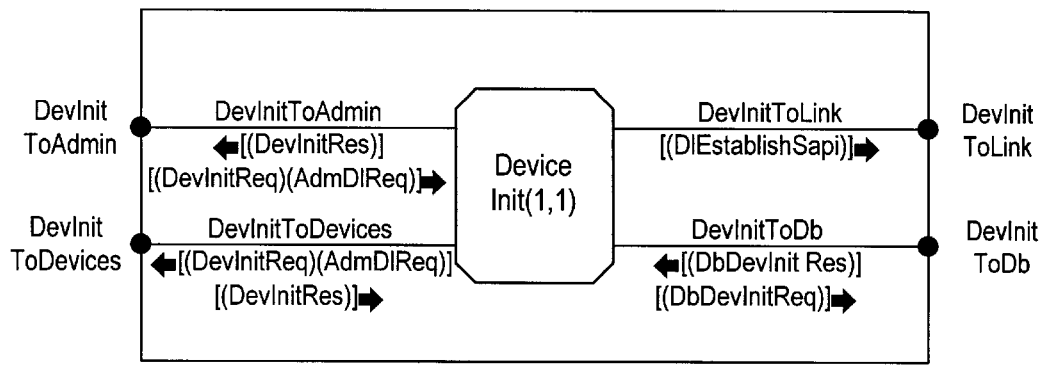
Figure 2O:
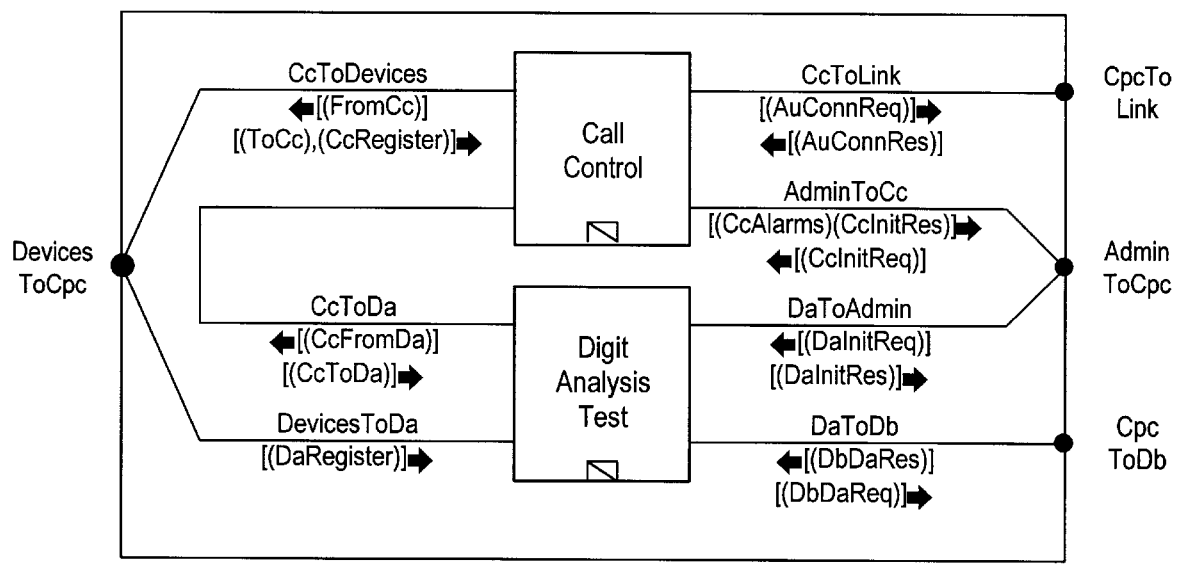
Figure 2P:
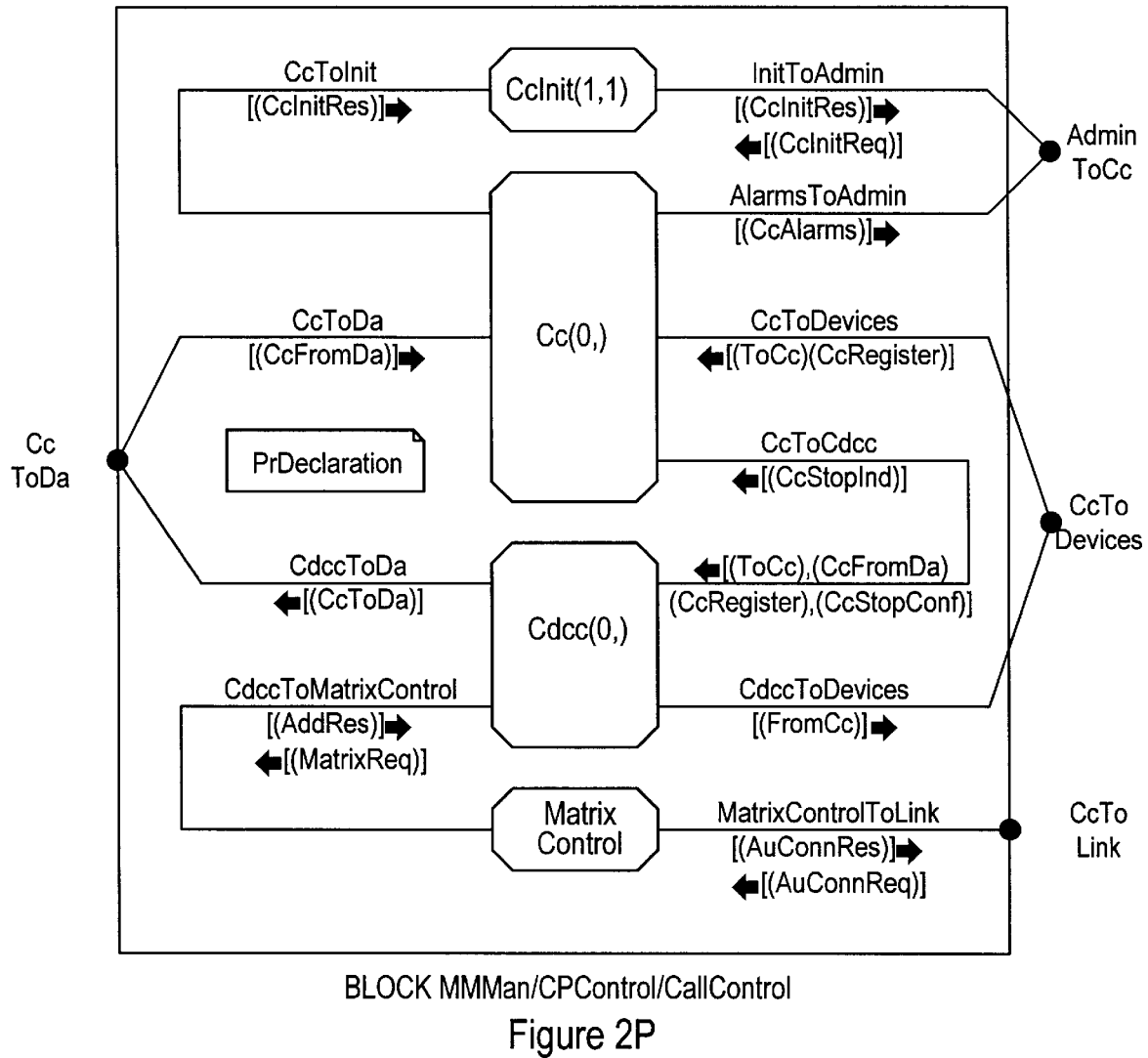
Figure 2Q:
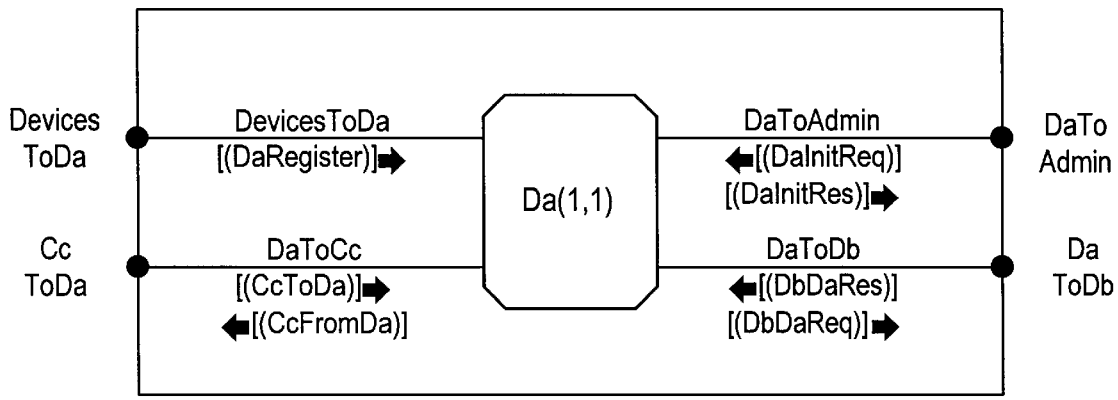
Figure 2R:
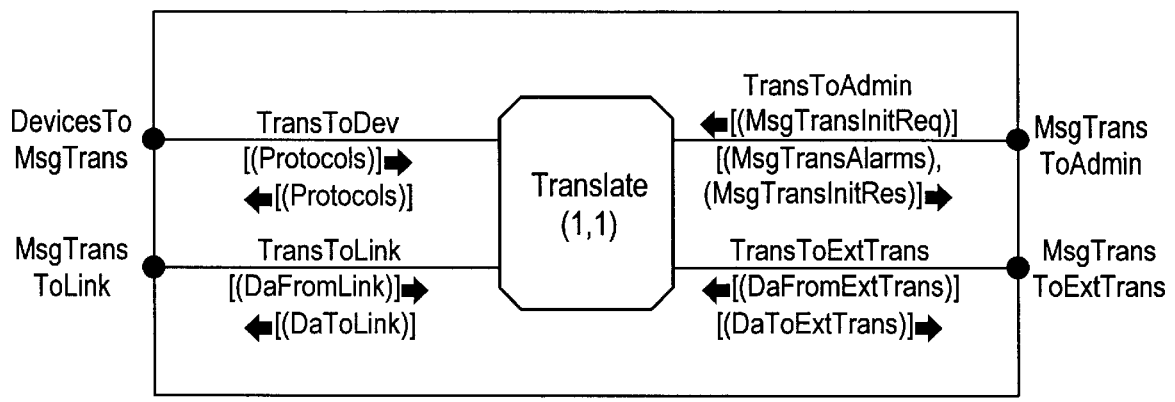
Figure 2S:
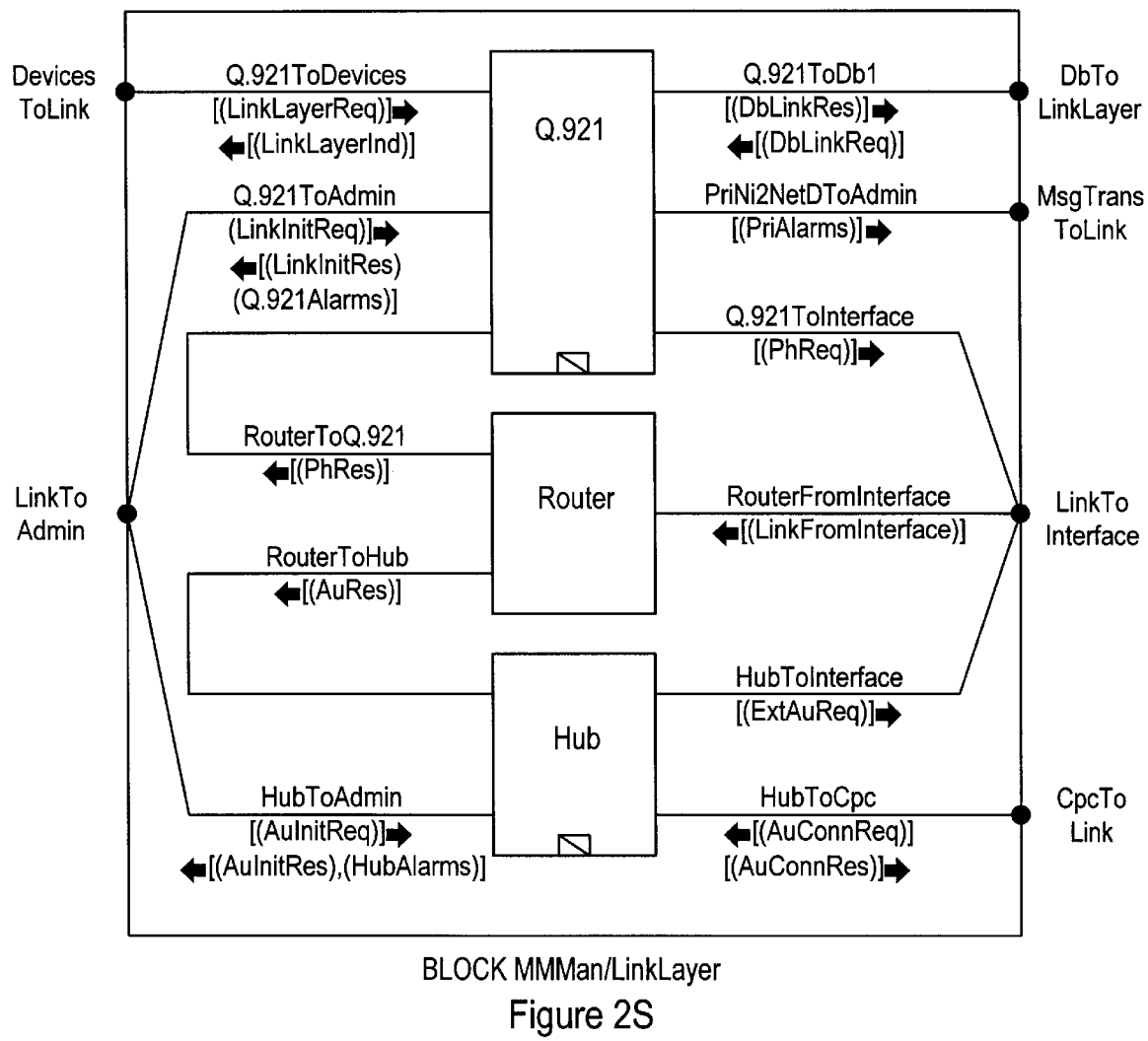
Figure 2T:
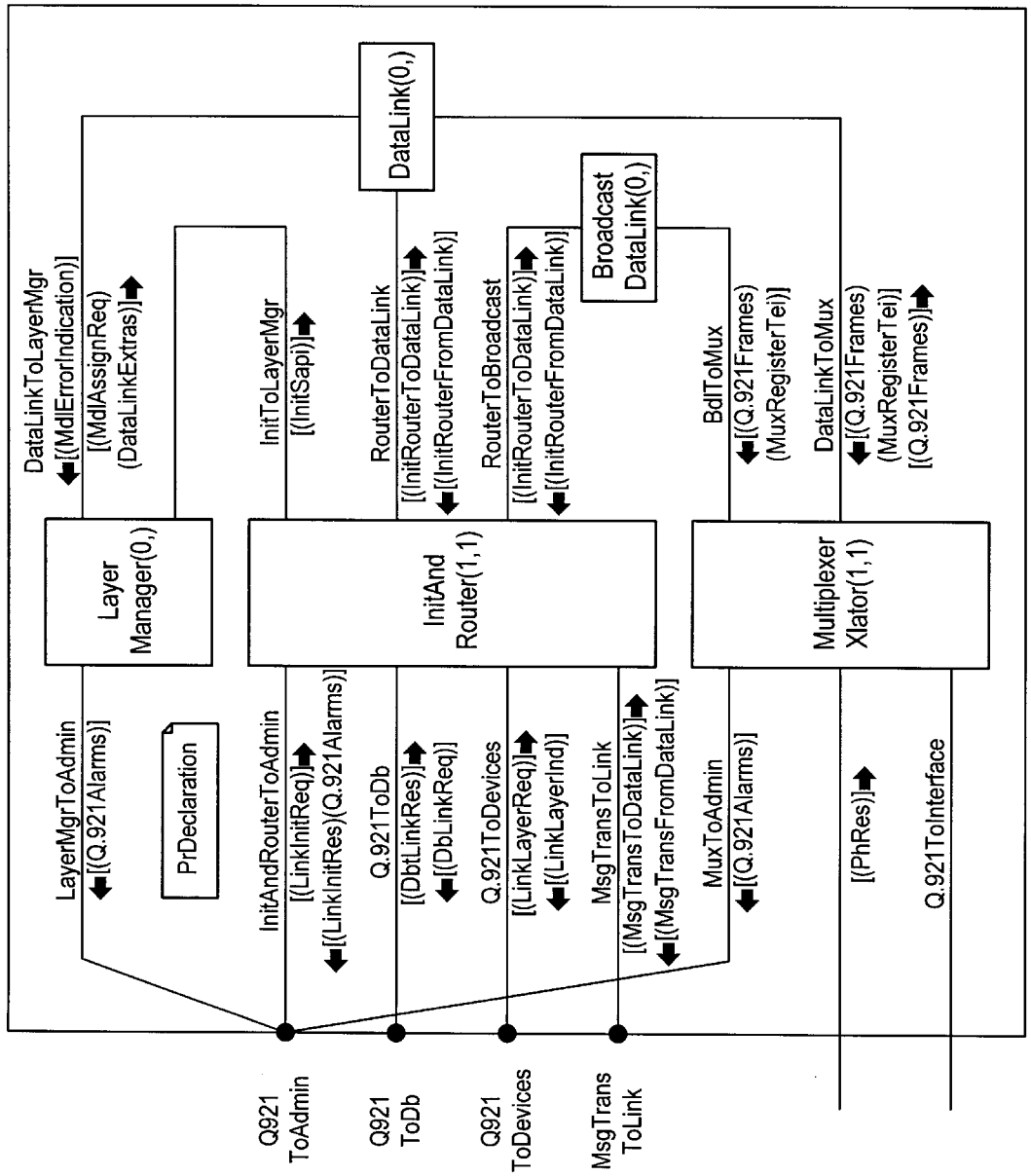
Figure 2U:
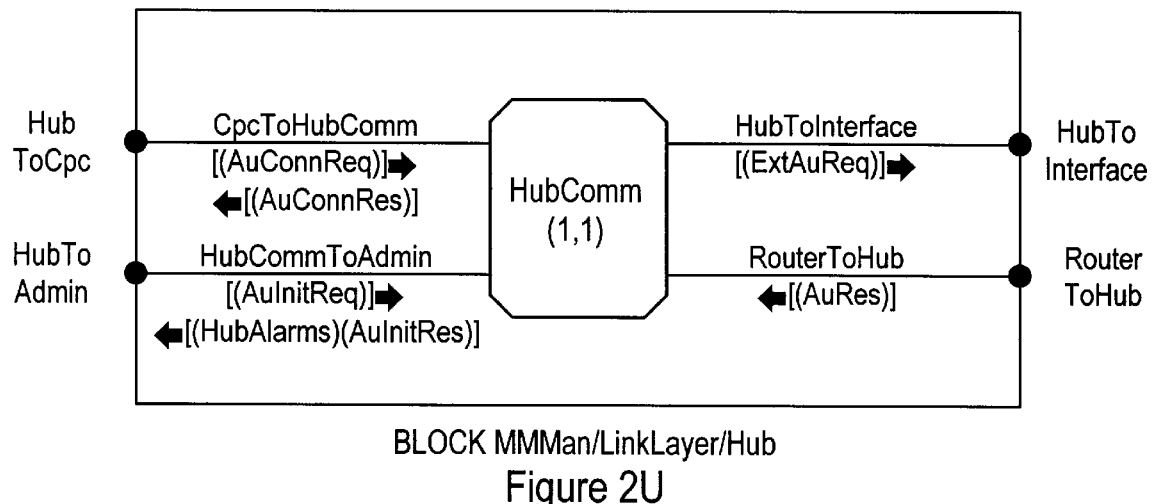
Figure 2V:
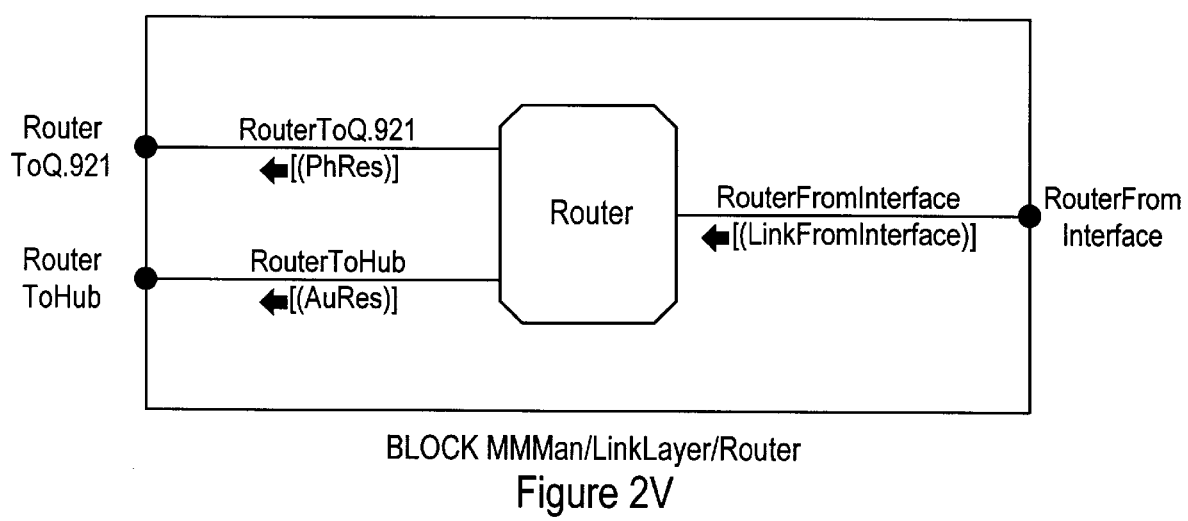
Figure 2W:
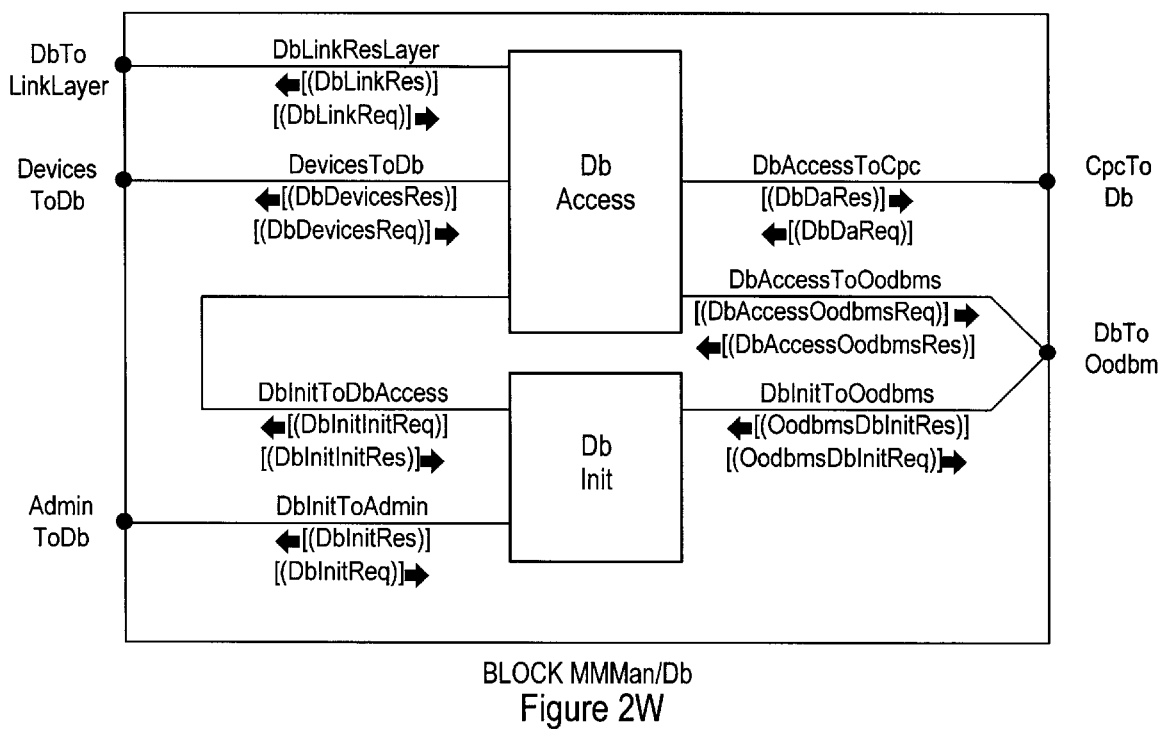
Figure 2X:
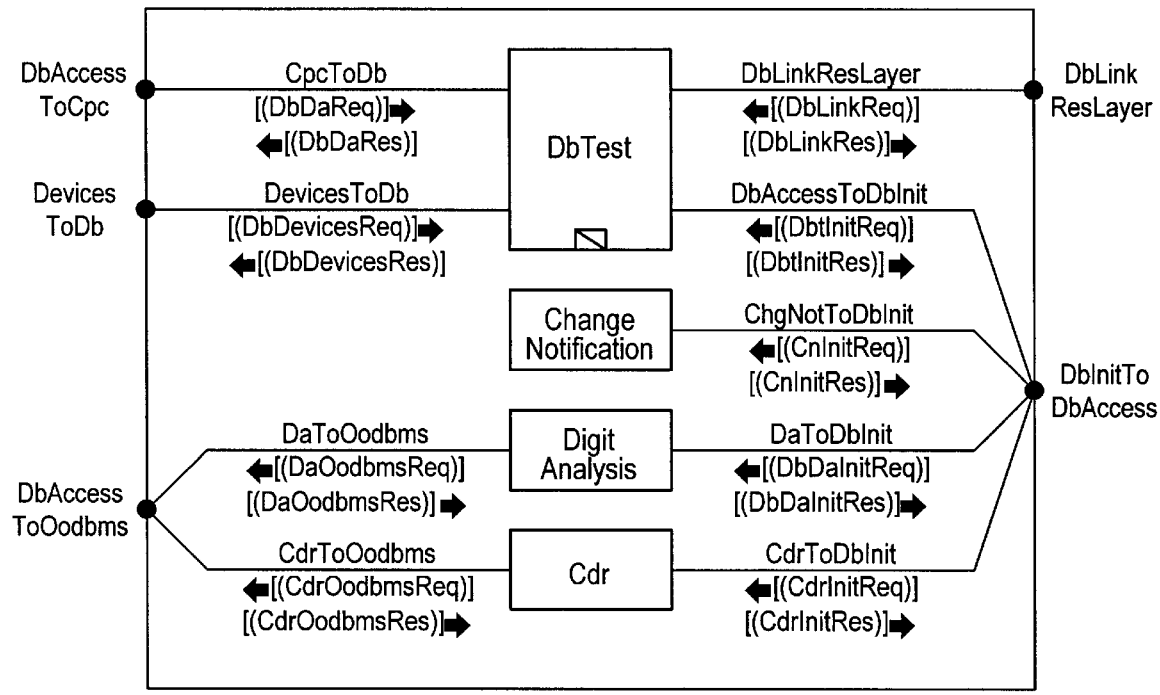
Figure 2Y:
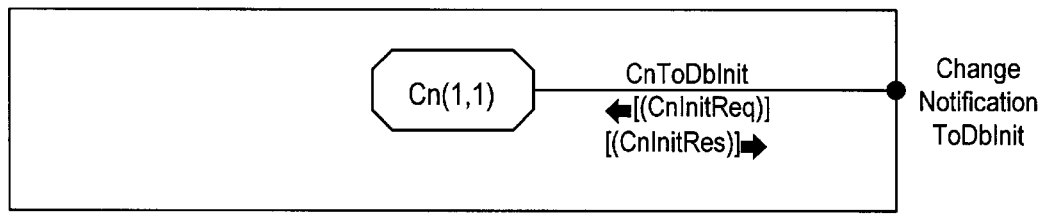
Figure 2Z:
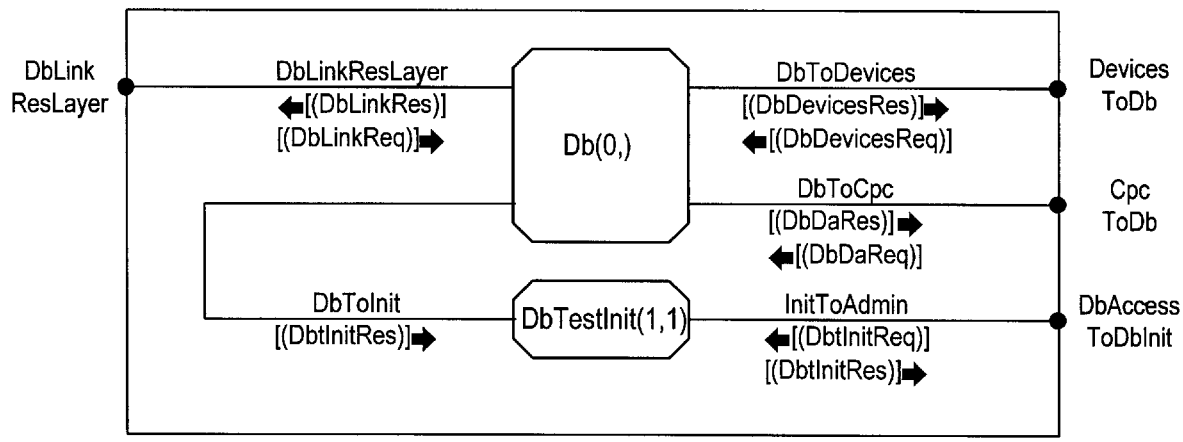
Figure 2A:
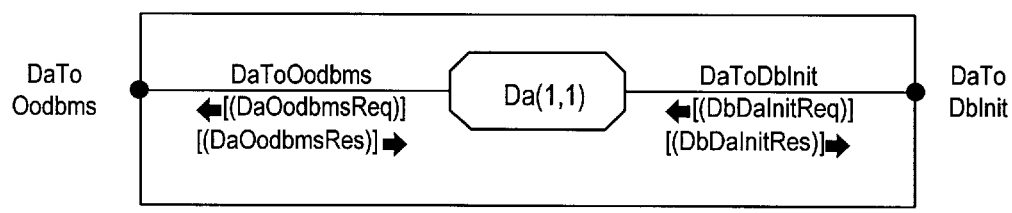
Figure 2B:
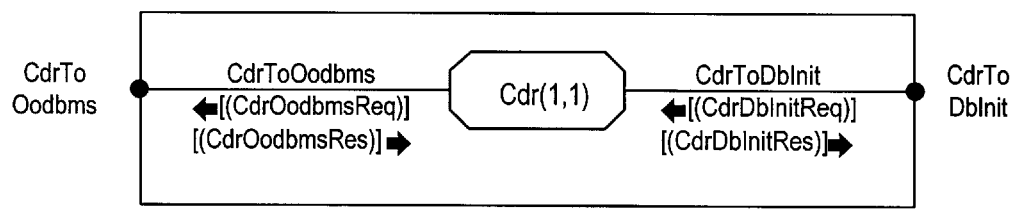
Figure 2C:
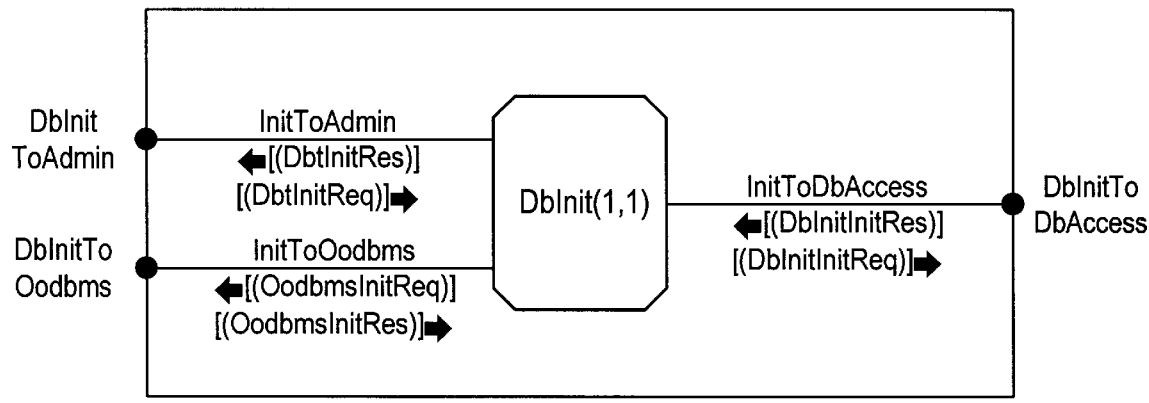

Turning now to FIGS. 2A–2CC, taken in conjunction, illustrated are block diagrams in Specification Design Language ("SDL") for a multimedia manager subsystem according to the present invention. Any person ordinarily skilled in the art can make and use the present invention with respect to the multimedia manager 190 and its interrelated functions to the multimedia system 100 by reviewing the logical diagrams.

Referring to FIG. 2A, the multimedia manager 190 comprises an administration section 210, an database section 220, a devices section 230, a call process control ("CPControl") section 240, a message translation section 250, a link layer section 260 and interconnecting pathways.

The administration section 210 is responsible for the administrative functions in the multimedia manager 190 including, but not limited to, initialization of the multimedia manager 190 and configuration changes made to a database in the database section 220 throughout the multimedia manager 190. The administration section 210 is logically connected to a system manager (not shown) through an administration to system manager pathway 211. The administration section 210 is logically connected to the database section 220, the devices section 230, CPControl section 240, message translation section 250 and the link layer section 260 through an administration to database pathway 213, a devices to administration pathway 214, an administration to CPControl pathway 215, a message translation to administration pathway 216 and a link layer to administration pathway 217, respectively. The direction of the pathway of information between respective sections is as shown by the directional arrows on each individual pathway.

The database section 220 provides a centralized interface to an object-oriented database (not shown) and contains the knowledge for the database implementation within the multimedia manager 190. The database section 220 is logically connected to the object-oriented database through a database to object-oriented database pathway 221. The database section 220 is logically connected to the administration section 210, the devices section 230, the CPControl section 240 and the link layer section 260 through the administration to database pathway 213, a devices to database pathway 223, a CPControl to database pathway 225 and a database to link layer pathway 227, respectively.

The devices section 230 contains the protocols to interface with all types of external devices including, but not limited to, PRI trunks, IEEE 802.9 endpoints, foreign PBXs through PRI or QSIG and BRI telephones. The devices section 230 is logically connected to the administration section 210, database section 220, CPControl section 240, message translator section 250 and the link layer section 260 through the devices to administration pathway 214, the devices to database pathway 223, a devices to CPControl pathway 232, a devices to message translator pathway 234 and a devices to link layer pathway 236, respectively.

The CPControl section 240 handles tasks such as management and routing of the connection between external devices, such as the BRI telephone and the IEEE 802.9 endpoint and management of the matrix connection provided by the multimedia hub 120. The CPControl section 240 is logically connected to the administration section 210, the database section 220, the devices section 230 and the link layer section 260 through the administration to CPControl pathway 215, the CPControl to database pathway 225, the devices to CPControl pathway 232 and a CPControl to link layer pathway 245, respectively.

The message translator section 250 provides an interface between the protocols foreign the multimedia manager 190 and the multimedia manager 190 internal protocol. The message translator section 250 is logically connected to an external translator (not shown) through a message translator to external translator pathway 253. The message translator section 250 is logically connected to the administration section 210, the devices section 230 and the link layer section 260 through the message translator to administration pathway 216, the devices to message translator pathway 234 and a message translator to link layer pathway 256, respectively.

The link layer section 260 provides reliable communication between the multimedia manager 190 and the endpoints. The link layer section 260 is logically connected to a multimedia hub (not shown) through a link to interface pathway 265. The link layer section 260 is logically connected to the administration section 210, the database section 220, the devices section 230, the CPControl section 240 and the message translation section 250 through the link layer to the administration pathway 217, the database to the link layer pathway 227, the devices to link layer pathway 236, the CPControl to link layer pathway 245 and the message translation to link layer pathway 256, respectively. The messages in brackets between respective sections are representative messages sent on the pathways.

Now referring to FIGS. 2B–2CC, each FIGURE logically illustrates a specific section of the multimedia manager 190. With reference to FIG. 2A, any person ordinarily skilled in the art can make and use the present invention with respect to the multimedia manager 190 and its interrelated functions to the multimedia system 100.

Figure 3:
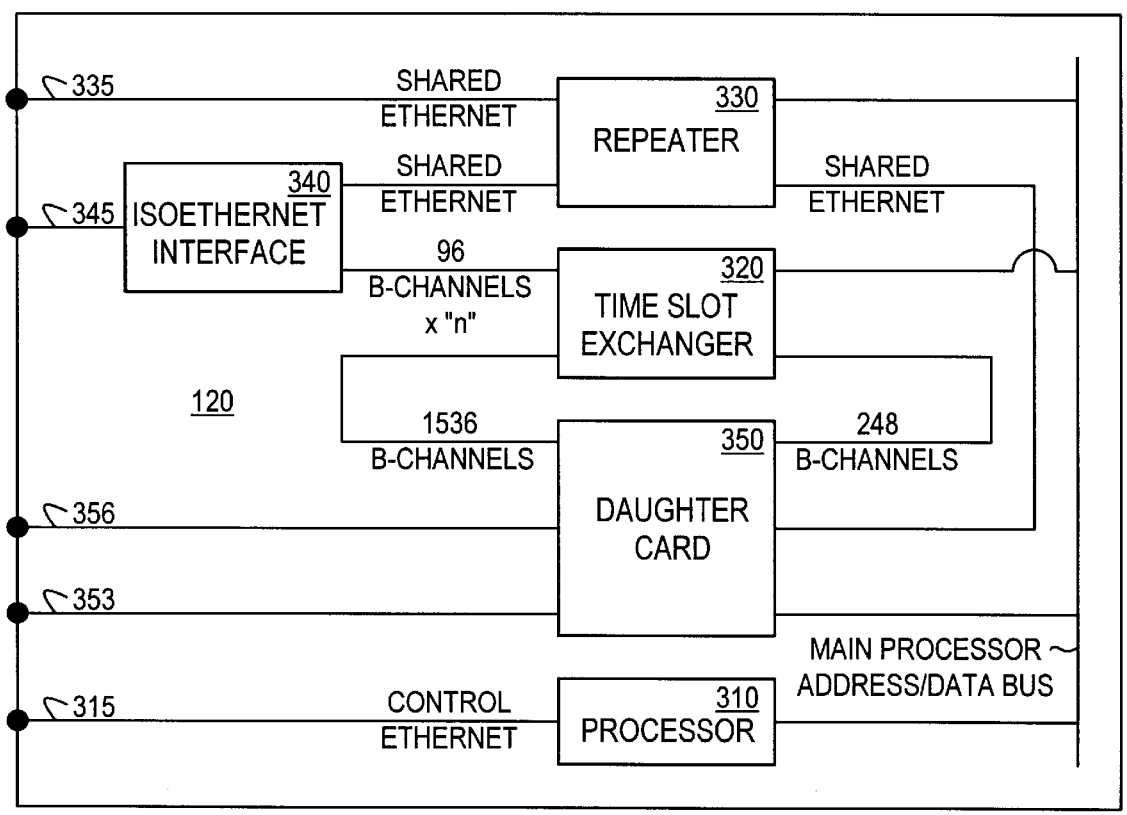
FIG. 3 illustrates a block diagram of a multimedia hub according to the present invention.

Turning now to FIG. 3, illustrated is a block diagram of a multimedia hub 120 according to the present invention. The multimedia hub 120 comprises a main processor 310, a time slot exchanger 320, a repeater 330, an isoEthernet® interface 340 and a daughter card 350.

The processor 310 is the signalling and control component of the multimedia hub 120. A purpose of the processor 310 is to act as a signalling bridge (e.g. between isochronous and non-isochronous channels) and to control the other components within the multimedia hub 120. As a bridge, the processor bridges D channel data from other components in the multimedia system to an Ethernet® segment and interfaces to the Ethernet® network at port 315. Through this connection, a control and signalling interface is provided between multimedia managers 190 and the multimedia hub 120. The processor 310 also allows the multimedia hub 120 to act as an SNMP agent through information received by way of the D channel. In the illustrated embodiment the processor comprises an Intel 80386EX microprocessor.

The time slot exchanger 320 is a digital switch that provides a switching matrix (or isochronous switching resource) within the multimedia hub 120. The time slot exchanger 320 acts to switch synchronous digital data between the isoEthernet® interface 340 (12 ports@ 96 B channels per port), an ATM backbone interface (not shown: total of 1536 B channels) and a digital signal processor ("DSP") (not shown: 248 B channels). In the illustrated embodiment the time slot exchanger comprises an isoTSX® chip manufactured by National Semiconductor Corporation.

The repeater 330 acts as a shared Ethernet® segment component. The repeater 330 provides a packet Ethernet® interface to the isoEthernet® interface 340 and an interface to an external Ethernet® port 335. The shared segment provides for exchange of packetized data between external components and the multimedia hub 120.

The isoEthernet® interface 340 represents 12 external interfaces connected at ports 345 to isoEthernet® devices. Each isoEthernet® interface 340 comprises a multiplexer that will multiplex/demultiplex ("mux/demux") 96 isochronous B channels, an Ethernet® channel, a D channel and a maintenance channel. Additional circuits provide adaptation between Manchester data encoding from the Ethernet® segment to 4B:5B inverted Non-Return to Zero ("NRZi") encoding. In the illustrated embodiment the isoEthernet® interface 340 comprises multiple isoPHY® chips manufactured by National Semiconductor Corporation.

The daughter card 350 provides a number of enhanced services and services required for standard telephony. Although one daughter card 350 is illustrated, it is appreciated that multiple cards in lieu of one is within the scope of the present invention. In the illustrated embodiment, the daughter card 350 includes an ATM interface (not shown). The ATM interface provides the ATM adaption process to convert between an ATM cell and a non-ATM cell. For instance, the ATM interface provides the interface to 1536 B channels traversing a path between the daughter card 350 and the time slot exchanger 320. The ATM interface is connected to the ATM network through port 353.

The illustrated embodiment of the daughter card 350 also includes a DSP interface (not shown). The DSP provides signal processing to allow for media services, such as tone plant, dual tone multifrequency ("DTMF") detection, music-on-hold interface, padding and other functions. Music, or other data, supplied at the data port 356 may be digitized, processed and multiplexed to one or more B channels and provided as input to the time slot exchanger 320 for distribution among the isoEthernet® interface 340 and the ATM interface. Digital audio data from the time slot exchanger 320 may be supplied through one or more of the 248 B channels to the DSP and processed to provide DTMF detection and other functions.

Finally, an address/data bus 360 is shown coupling the main processor 310 to the other components in the multimedia hub 120.

Figure 4:
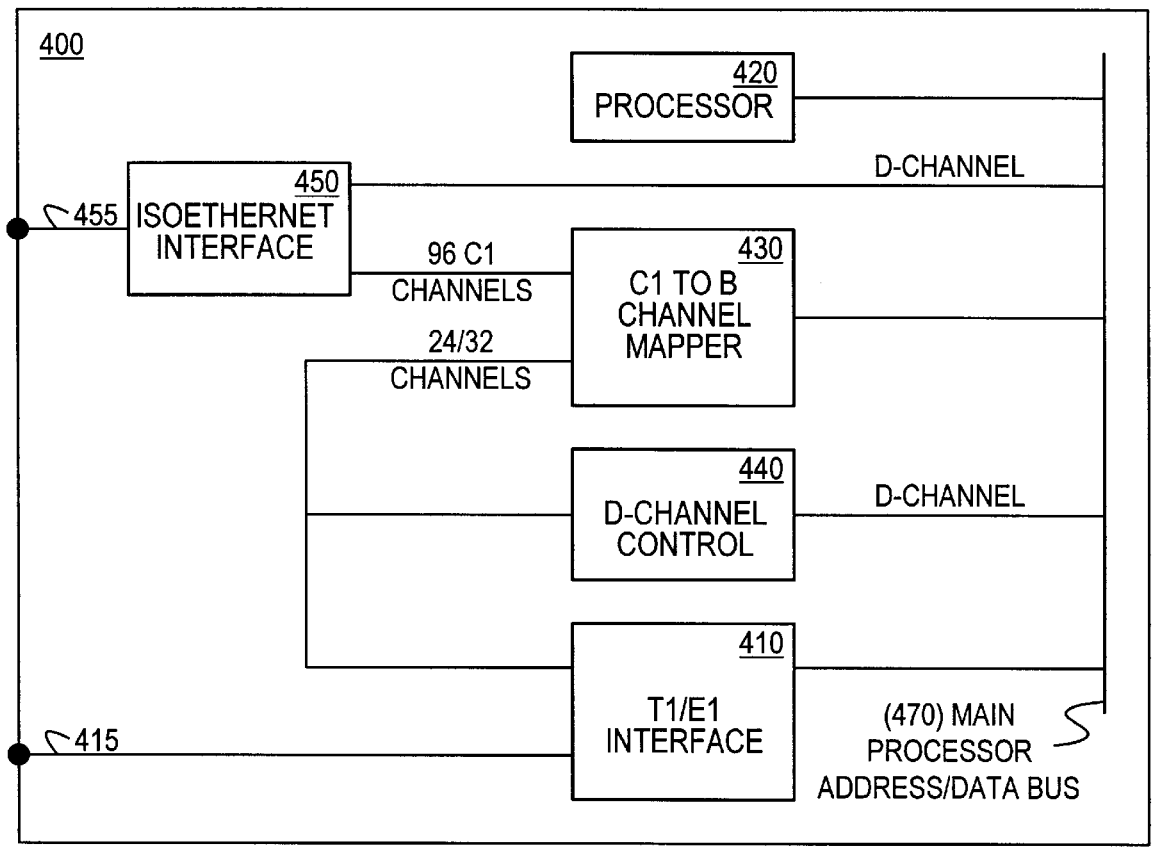
FIG. 4 illustrates a block diagram of a PRI hub according to the present invention.

Turning now to FIG. 4, illustrated is a block diagram of a PRI hub 140 according to the present invention. The PRI hub 140 comprises a T1/E1 or ISDN interface 410, a PRI main processor 420, a Cl to B channel mapper 430, a D channel controller 440, and a PRI isoEthernet® interface 450.

The T1/E1 interface 410 provides up to four T1 or three E1 interfaces between external ISDN PRI T1 and E1 spans and the processor 420 and D channel controller 440. The T1/E1 interface 410 supports D channel ISDN signalling. The T1/E1 interface 410 is provides an interface to 24 (T1) or 32 (E1) synchronous information channels, comprising both B channels and D channels, through a plurality of T1/E1 interface ports 415. In the illustrated embodiment the T1/E1 interface 410 comprises a Dallas Semiconductor 2151 (T1) or 2153 (E1) chip.

The PRI processor 420 is the signalling and control component of the PRI hub 120. A purpose of the PRI processor 420 is to provide D channel and MAC layer bridging between the signalling channel of the isoEthernet® interface 450 and the ISDN interface 410. The PRI processor 420 also allows the PRI hub 140 to act as an SNMP agent through information received by way of the D channel. The PRI hub In the illustrated embodiment the processor comprises an Intel 80386EX microprocessor.

The C1 to B channel mapper 430 maps C1 channels at the isoEthernet® interface 450 with B channels at the ISDN interface 410. In the illustrated embodiment the C1 to B channel mapper 430 comprises a Siemens 2055 (EPIC) chip.

The D channel controller 440 serves as a D channel signalling interface between the PRI processor 420 and the T1/E1 interface 410. In the illustrated embodiment the D channel controller 440 comprises a Siemens 2075 HDLC controller.

The PRI hub isoEthernet® interface 450 comprises a primary and secondary PRI isoEthernet® interfaces 450 and coupling busses. Two PRI isoEthernet® interfaces 450 provide redundant connections to a primary and secondary multimedia hub 120 (not shown). In the event of a loss of the primary multimedia hub 120, the system will automatically reconfigure itself to provide multimedia hub 120 connection and service through the redundant port to the secondary multimedia hub. PRI IsoEthernet® interface ports 455 provide primary and secondary isoEthernet® connectivity. In the illustrated embodiment the PRI isoEthernet® interface 450 comprises an isoPHY® chip manufactured by National Semiconductor Corporation.

Finally, a PRI address/data bus 470 is shown coupling the PRI main processor 420 to the other components in the PRI hub 140.

Figure 5A:
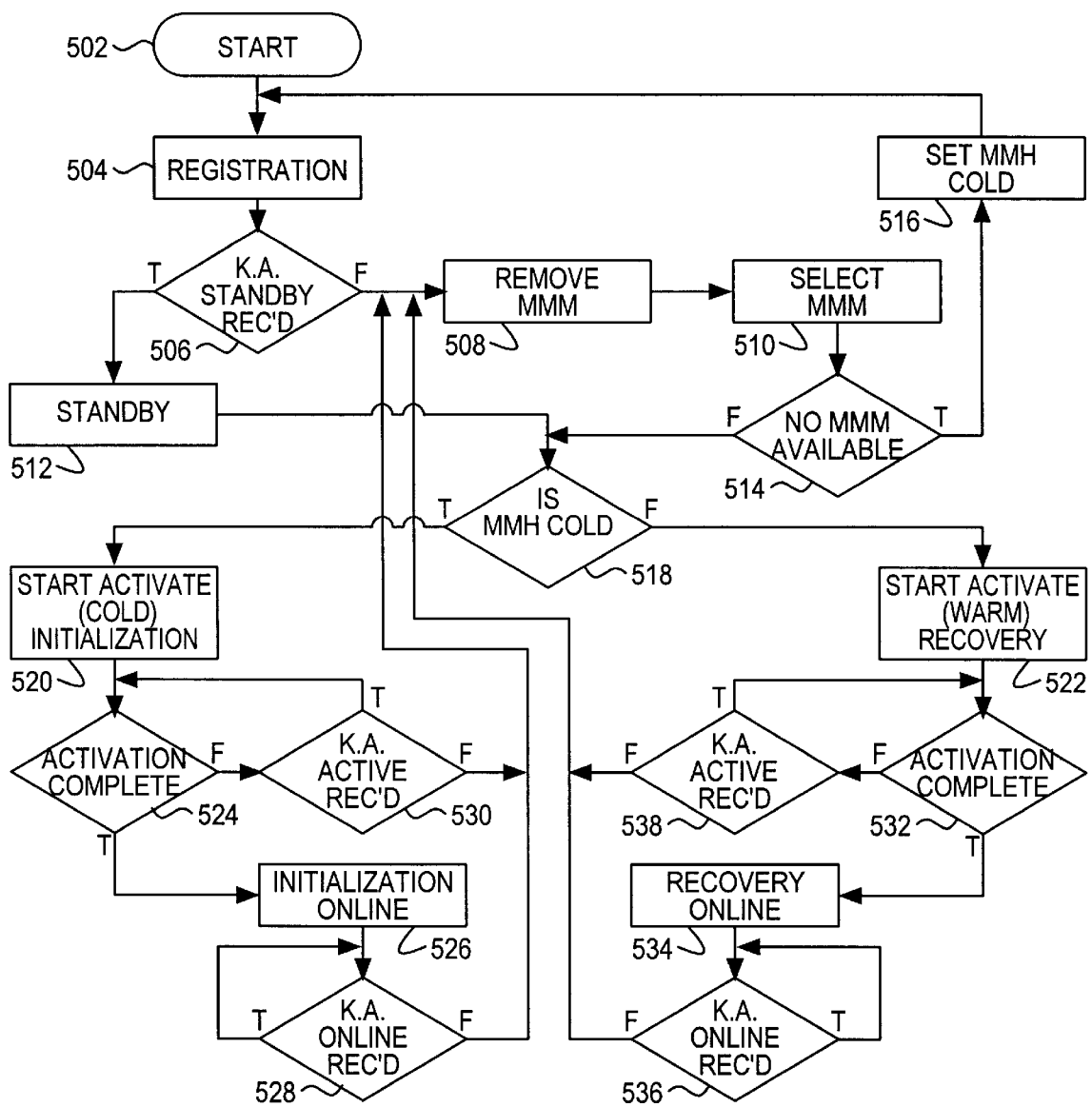
FIG. 5A illustrates a flow diagram of an initialization and recovery procedure for a multimedia hub of the multimedia system of the present invention.

Turning now to FIG. 5A, illustrated is a flow diagram of an initialization and recovery procedure for a multimedia hub 120 of the multimedia system of the present invention. The multimedia hub 120 is responsible for selecting a multimedia manager 190 under whose control it will operate. The multimedia hub 120 keeps a list of potential multimedia managers 190. Each multimedia manager 190 is assigned a unique priority from the perspective multimedia hubs 120. The priorities reflect the rank ordering of the associated multimedia manager 190 to be the manager for the multimedia hub 120. Each multimedia manager 190 added to the potential list to control the multimedia hub 120 conducts a keep-alive protocol with the multimedia hub 120. The protocol consists of a keep-alive message initiated by the multimedia manager 190 every 3–5 seconds and a keep-alive acknowledge from the multimedia hub 120. Absence of these keep-alive messages causes the multimedia hub 120 to drop the corresponding multimedia manager 190 as an active multimedia manager 190. Loss of an on-line multimedia manager 190 results in a reselection of another multimedia manager 190 and requires re-registration of the failed multimedia manager 190.

The initialization and recovery process begins with a start step 502 and proceeds to a registration step 504. The multimedia managers 190 are registering the availability to serve their respective multimedia hubs 120 in the registration step 504. In a keep-alive standby received decisional step 506, the multimedia hubs 120 indicate that the multimedia managers 190 remain available to act as potential managers of the multimedia hub 120. If the multimedia hub 120 fails to receive a keep-alive standby by a multimedia manager 190, then the multimedia hub 120 removes the multimedia manager 190 from the standby state in a remove step 508 and then attempts to select another multimedia manager 190 in a select step 510. In an availability decisional step 514, the multimedia hub 120 is asked whether a multimedia manager 190 is available to manage the multimedia hub 120. If no multimedia managers 190 are available to serve the multimedia hub 120, then in a set multimedia hub cold step 516 the multimedia hub's 120 status is set to cold and directed to the registration step 504.

Returning to the keep-alive standby received decisional step 506, if the multimedia hub 120 receives a keep-alive standby by a multimedia manager 190, then the multimedia hub 120 acknowledges the multimedia manager 190 and instructs the multimedia manager 190 to standby in a standby step 512. Once again, the keep-alive messaging is an on-going process. Therefore, to this point it has been determined that at least one multimedia manager 190 is available for the multimedia hub 120.

Upon the occurrence of an external stimulus, the multimedia hub 120 next is questioned as to its state in a multimedia hub cold decisional step 518. If the multimedia hub 120 is cold, then an activate initialization step 520 commences. If the multimedia hub 120 is warm, then an activate recovery step 522 commences. The initialization phase is a process by which the multimedia hub 120 obtains information from an available multimedia manager 190 such as tone cadence and language for the enunciating language. Conversely, since the multimedia hub 120 has previously been initialized, the recovery phase is a process by which an available multimedia manager 190 obtains information from the multimedia hub 120 such as the matrix connection information.

In an initialization activation complete decisional step 524, it is determined if the initialization activation is completed. If the initialization activation is complete, then the call processing is enabled and the multimedia hub 120 is online as shown in an initialization online step 526. In an initialization keep-alive online received decisional step 528, the multimedia hub 120 determines if the multimedia manager 190 remains online. If the multimedia manager 190 continues to transmit the keep-alive messages, then multimedia hub 120 remains online with that multimedia manager 190 and the process returns to the initialization keep-alive online received step 528. If the multimedia manager 190 does not transmit the keep-alive messages, then the process returns to the remove step 508.

If the initialization activation process is not complete in an initialization keep-alive active received decisional step 530, the multimedia hub 120 determines if the multimedia manager 190 is active. If the multimedia hub 120 receives a keep-alive message from the multimedia manager 190, then initialization continues and the process returns to the initialization activation complete decisional step 524. If the multimedia hub 120 does not receive a keep-alive message from the multimedia manager 190, then the process returns to the remove step 508.

The recovery process occurs in very much the same manner. In a recovery activation complete decisional step 532, it is determined if the recovery activation is completed. If the recovery activation is complete, then the call processing is enabled and the multimedia hub 120 is online as shown in a recovery online step 534. In a recovery keep-alive online received decisional step 536, the multimedia hub 120 determines if the multimedia manager 190 remains online. If the multimedia manager 190 continues to transmit the keep-alive messages, the multimedia hub 120 remains online with that multimedia manager 190 and the process returns to the recovery keep-alive online received decisional step 536. If the multimedia manager 190 does not transmit the keep-alive messages, then the process returns to the remove step 508.

If the recovery activation process is not complete, in a recovery keep-alive active received decisional step 538, the multimedia hub 120 determines if the multimedia manager 190 is active. If the multimedia hub 120 receives a keep-alive message from the multimedia manager 190, then recovery continues and the process returns to the recovery activation complete step 532. If the multimedia hub 120 does not receive a keep-alive message from the multimedia manager 190, then the process returns to the remove step 508.

The initialization and recovery system is an example of the survivability of the present invention. When the multimedia hub 120 loses a multimedia manager 190, it survives the loss by selecting another multimedia manager 190 to manage its functions. This flexibility is apparent throughout the entire multimedia system.

Figure 5B:
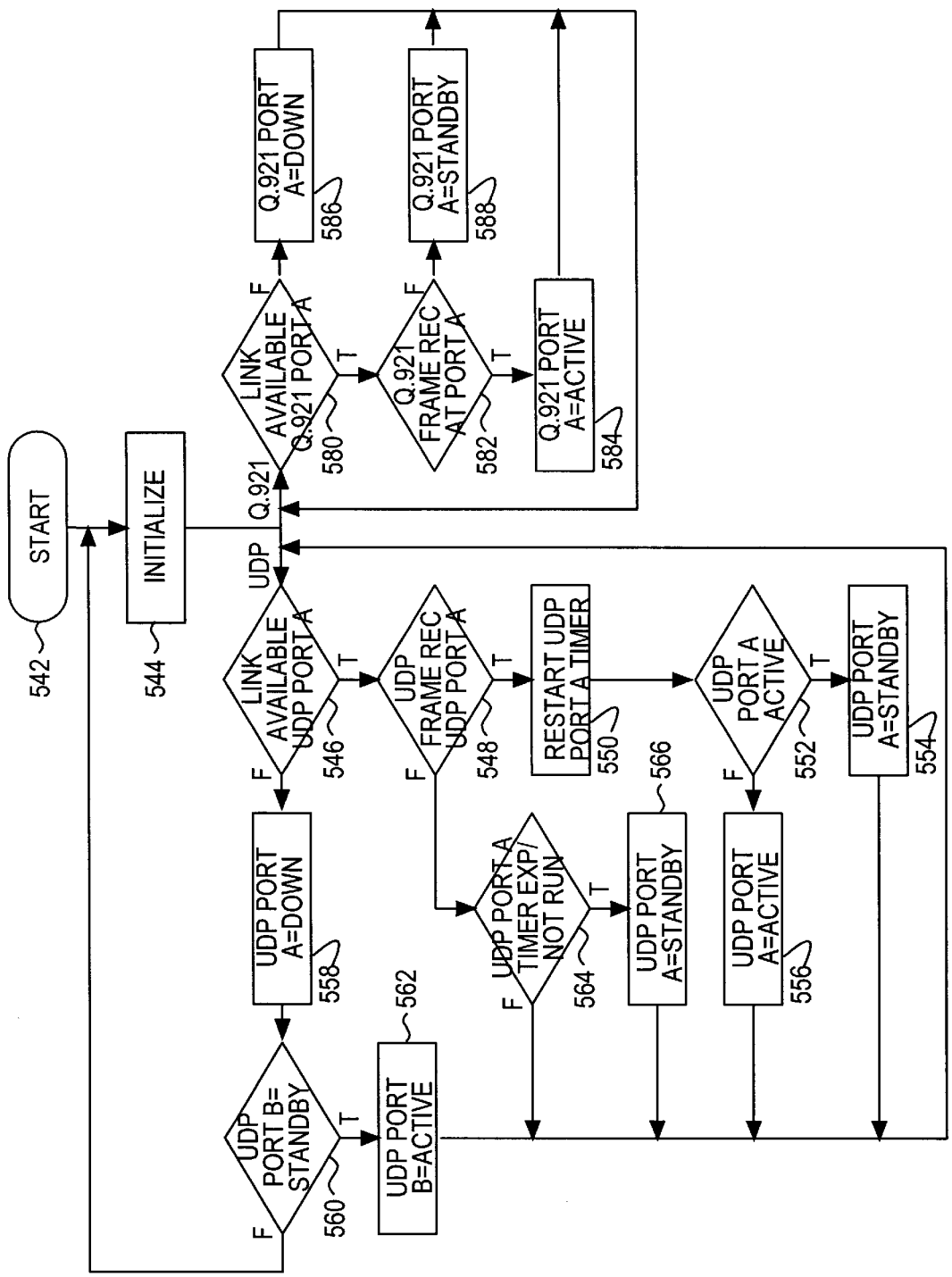
FIG. 5B illustrates a flow diagram of an initialization and recovery procedure for a peripheral hub of the multimedia system of the present invention.

Turning now to FIG. 5B, illustrated is a flow diagram of an initialization and recovery procedure for a peripheral hub of the multimedia system of the present invention. The peripheral hubs comprise all hubs in the multimedia system 100 excluding the multimedia hub 120. As opposed to the multimedia hub 120 wherein five states (cold, register, standby, active and online) represent the status of the hub, three states (down, standby and active) represent the state of a peripheral hubs isoEthernet® port.

The illustrated embodiment describes the initialization and recovery procedure wherein a PRI hub 140 communicates with a plurality of multimedia hubs 120 through a plurality of isoEthernet® interfaces and a plurality ports. The procedure is described with respect to a single port (port A) on the PRI hub 140, although the procedure is equally applicable to the other ports on the hub. Since the ports are coupled to a plurality multimedia hubs 120, then an active and standby port provide connectivity through redundant links (or backbones) to the multimedia hubs 120. Thus, one link is considered to be an active link to the multimedia hubs 120 and the other peripheral hubs, and a second link operates in a standby capacity to provide redundancy.

The procedure begins at a start step 542 and the peripheral hub initializes when the multimedia system powers up at an initialize step 544. Concurrently, a Uniform Datagram Protocol ("UDP") port and a Q.921 port are providing links for the UDP frames and Q.921 frames, respectively, that are to be processed by the peripheral hubs. The application of the UDP frames and Q.921 frames to the signalling functionality of the multimedia system is the subject of U.S. Pat. No. 5,594,732, filed on Mar. 3, 1995, entitled "Bridging and Out-of-Band Signalling Subsystems and Methods for a Multimedia System," commonly assigned with the present invention and previously incorporated herein by reference. The UDP port segment of the procedure commences with a UDP link available decisional step 546. If there is a UDP link available on port A, then the next inquiry is whether a UDP frame is received at UDP port A in a UDP frame received decisional step 548. If a UDP frame is received, then at a restart timer step 550 the UDP timer is restarted. After the UDP timer is restarted, in a UDP port A decisional step 552 a determination is made whether the UDP port A is active. If the UDP port A is active, then the UDP port A is set to standby in a first UDP port A standby step 554, and then the UDP procedure returns to the UDP link available decisional step 546. If the UDP port A is not active, then the UDP port A is set to active in a UDP port A active step 556, and then the UDP procedure returns to the UDP link available decisional step 546.

Revisiting the UDP link available decisional step 546, if a UDP link is not available on port A, then the UDP port A is set to down in a UDP port A down step 558. Next, in a UDP port B standby decisional step 560, it is determined whether a UDP port B is in the standby state. If the UDP port B is not in standby, then the UDP procedure returns to the initialize step 544. If the UDP port B is in standby, then the UDP port B is set to active in a UDP port B active step 562, and then the UDP procedure returns the UDP link available decisional step 546.

Revisiting the UDP frame received decisional step 548, if a UDP frame is not received on UDP port A, then the UDP timer is checked in a check the UDP timer decisional step 564. If the UDP timer is expired, then the UDP procedure returns to the UDP link available decisional step 546. If the UDP timer is not expired, then the UDP port A is set to standby in a second UDP port A standby step 566, and finally the UDP procedure returns to the UDP link available decisional step 546.

The Q.921 port segment of the procedure commences with a Q.921 link available decisional step 580. If there is a Q.921 link available on port A, then the next inquiry is whether a Q.921 frame is received at Q.921 port A in a Q.921 frame received decisional step 582. If a Q.921 frame is received, then the Q.921 port A is set to active in a Q.921 port A active step 584, and then the Q.921 procedure returns to the Q.921 link available decisional step 580.

Revisiting the Q.921 link available decisional step 580, if a Q.921 link is not available on port A, then the Q.921 port A is set to down in a Q.921 port A down step 586, and then the Q.921 procedure returns to the Q.921 link available decisional step 580. Revisiting the Q.921 frame received decisional step 582, if a Q.921 frame is not received on Q.921 port A, then the Q.921 port A is set to standby in a Q.921 port A standby step 588, and finally the Q.921 procedure returns to the Q.921 link available decisional step 580. Also, a Q.921 timer is omitted for simplicity, but it is understood that a timer is included in the Q.921 procedure.

Again, the initialization and recovery procedure with respect to the peripheral hubs provides an example of the survivability of the present invention.

Figure 6:
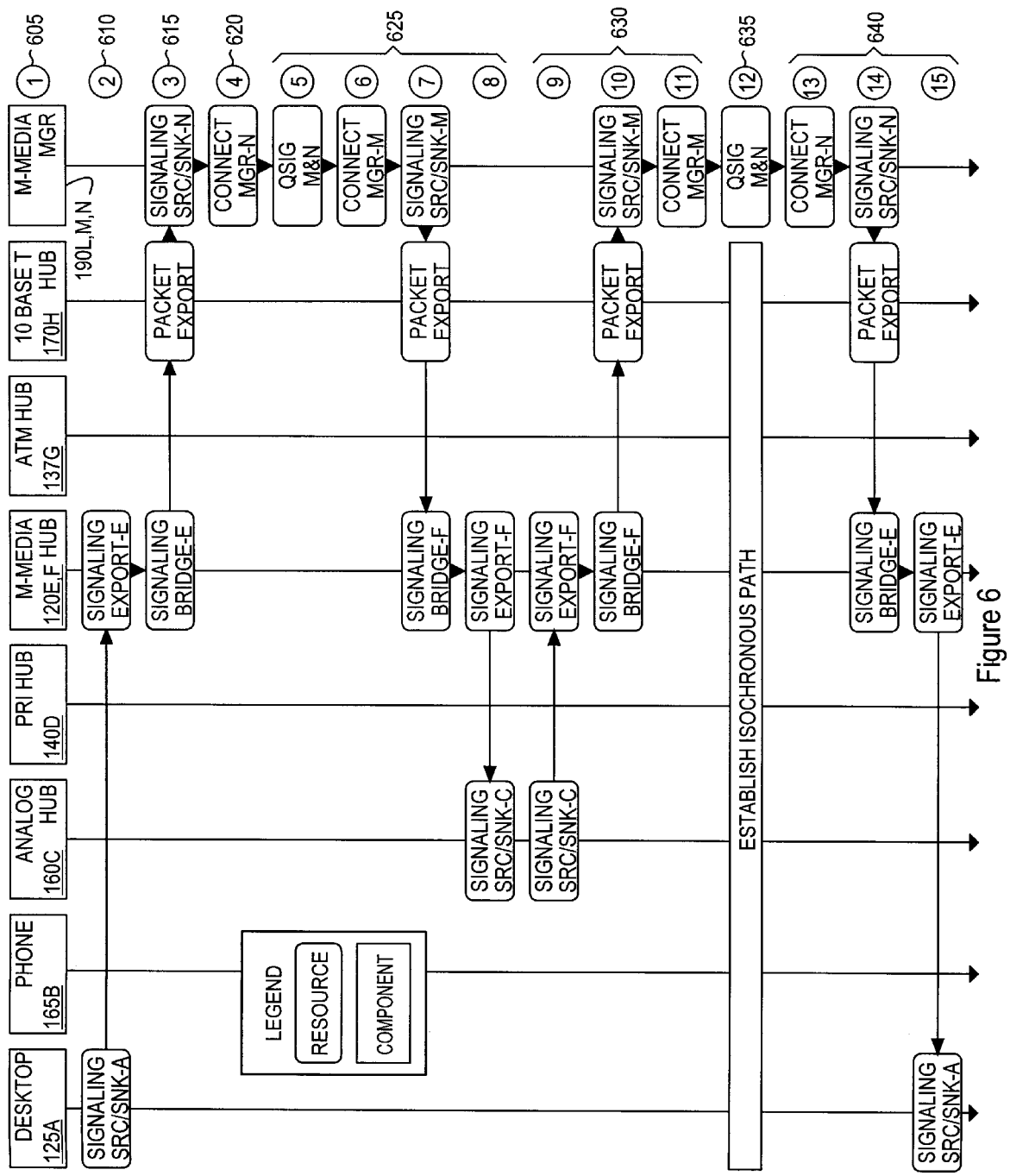
FIG. 6 illustrates a call flow diagram of a signalling process of the present invention for the purpose of showing distributed resource management, call processing and shared resource management according to the present invention.

Turning now to FIG. 6, illustrated is a call flow diagram of a signalling process of the present invention for the purpose of showing distributed resource management, call processing and shared resource management according to the present invention. The call flow diagram commences in a quiescent step 605 where the components of the system are initialized from a quiescent state. In desktop signalling step 610, desktop A or subordinate device A 125A requests a connection with phone B or POT B 165B. Next, in multimedia hub signalling step 615, multimedia hub E 120E requests connection from multimedia manager N 190N through 10Base-T hub H 170H. For ease of representation, the multimedia hubs E and F 120E, 120F are illustrated schematically within a single block. Similarly, multimedia managers L, M and N 190L, 190M, 190N are illustrated in a single block.

In a first connection management step 620, connection manager N associated with multimedia manager N 190N requests connection from connection manager M associated with multimedia manager 190M. Then, in a second connection management step 625, connection manager M associated with multimedia manager M 190M signals analog hub 160C by 10Base-T hub H 170H and multimedia hub F 120F. In analog connection step 630, the analog hub C 160C accepts the call. Then, in isochronous path step 635, an isochronous path is established between the endpoints. Finally, in acceptance step 640, connection manager N associated with multimedia manager N 190N accepts the call and informs desktop A 125A and the call is established.

If a connection cannot be made between connection manager N and connection manager M (e.g. phone B 165B is busy), then at the second connection management step 625 the multimedia manager N 190N informs desktop A 125A that the call cannot be completed and the call process terminates. Because the system of the present invention employs distributed resource management, the signalling subsystem reaches far into the signalling process before desktop A 125A is informed that a connection cannot be completed. While several resources are employed to reach that outcome, the result is that the system of the present invention is less complex than the present telephony networks.

Figure 7:
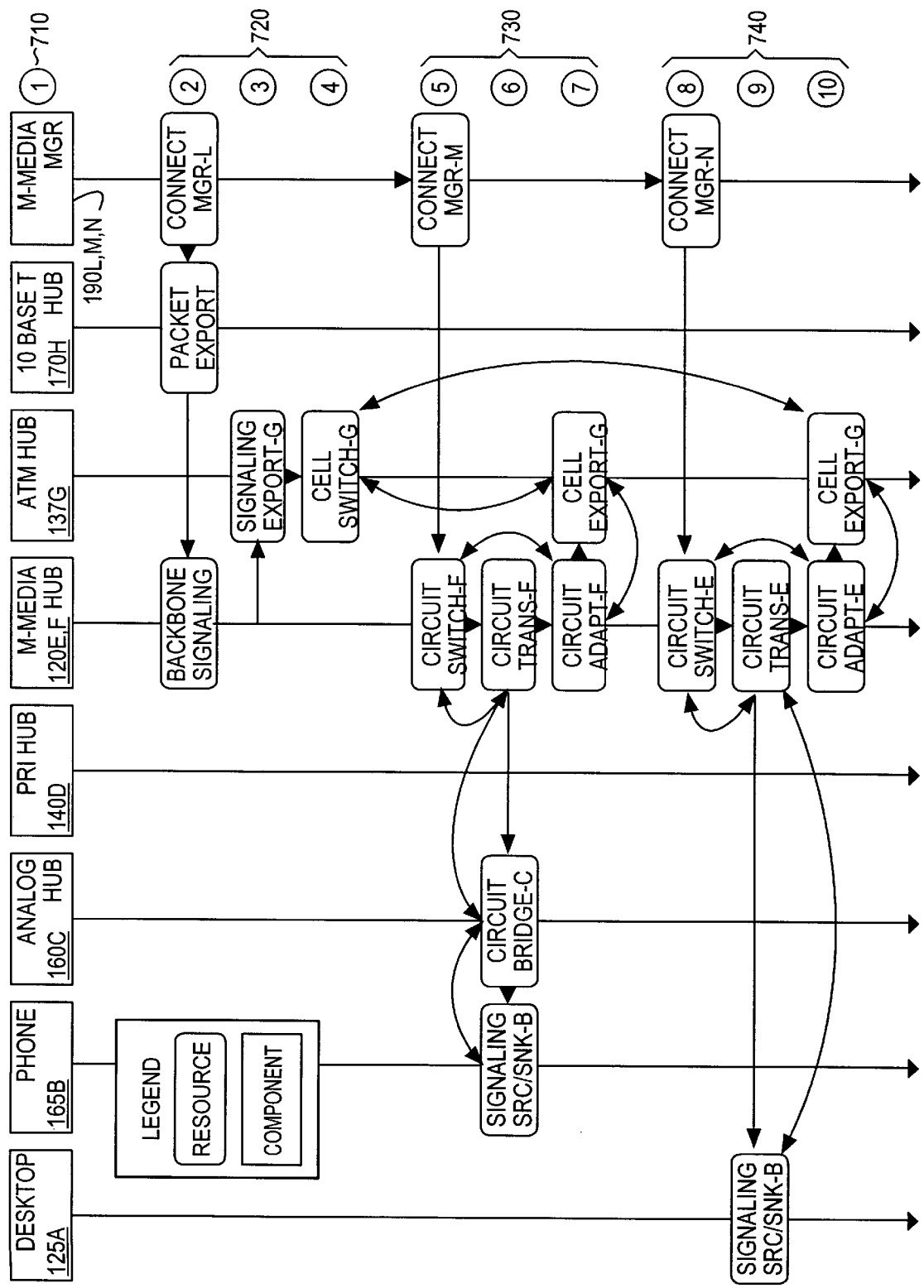
FIG. 7 illustrates a call flow diagram for a circuit setup of the present invention for the purpose of showing distributed resource management, call processing and shared resource management according to the present invention.

Turning now to FIG. 7, illustrated is a call flow diagram for a circuit setup of the present invention for the purpose of showing distributed resource management, call processing and shared resource management according to the present invention. Recall that, per FIG. 6, the circuit connection does not occur until isochronous path step 630. As described in U.S. Pat. No. 5,659,542, on Mar. 3, 1995, entitled "System and Method for Signalling and Call Processing for Private and Hybrid Communications Systems Including Multimedia Systems," commonly assigned with the present invention and incorporated herein by reference, because the signalling function is substantially completed prior to establishing a circuit connection between the endpoints, valuable bandwidth in the network is saved (among other advantages). The circuit path is signified by dark curved arrows.

The call flow diagram commences in a circuit quiescent step 710 where the components of the system are initialized from a quiescent state. In a backbone connection step 720, connection manager L associated with the multimedia manager L 190L requests a backbone connection. As previously mentioned, the multimedia managers L, M and N 190L, 190M, 190N are illustrated in a single block and the multimedia hubs E and F 120E, 120F are illustrated in a single block for ease of representation.

In a first circuit connection step 730, connection manager M associated with multimedia manager M 190M requests a circuit connection for multimedia hub F 120F. This is the phone interface. Then, in a second circuit connection step 740, connection manager N associated with multimedia manager N 190N request a circuit connection for multimedia hub E 120E. This is the desktop interface. The result is that a circuit path is established from desktop A 125A to phone B 165B through analog hub C 160C, multimedia hub F 120F, multimedia hub E 120E and ATM hub G 137G. Once again, if the signalling subsystem did not provide an available connection between desktop A 125A and phone B 165B the circuit connection would not have occurred.

Referring now to FIGS. 6 and 7, the signalling and circuit flow diagrams designate the distributed resources, shared resources and distributed call processing concepts of the network architecture of the present invention. A distributed interactive multimedia communications system implicitly requires that system resources by managed and controlled by their respective component managers. A truly distributed system implies that there is no single master, but rather a collection of peer entities that collaboratively interoperate. An interactive multimedia communications system requires the following resources to be distributed throughout the network. The interactive multimedia system of the present invention distributes the resources the network components as displayed in Table VII below.

TABLE VII

| Component | Distributed Resources Resources |
|---|---|
| Desktop | Signalling source/sink |
| | Voice source/sink |
| | Video source/sink |
| | Data source/sink |
| Phone | Voice source/sink |
| Multimedia Hub | Circuit Transport (for desktop voice/video) |
| | Packet Transport (for desktop data) |
| | Signalling Transport |
| | Circuit/Cell adaption bridge (for isoLAN to/from backbone) |
| | Circuit Switch (for desktop voice/video) |
| | Packet Switch or repeater (for desktop data) (optional) |
| | Signalling bridge - In-band to/from Out-of-band (connection/feature management) |
| | Control bridge - Out-of-band to/from In-band (component management) |
| | Voice conference bridge |
| | Video conference bridge |
| | Voice/video record function |
| | Voice/video playback function |
| PRI Hub | Signalling Transport |
| | isoLAN/WAN signalling bridge |
| | isoLAN/WAN circuit bridge |
| Analog Hub | Signalling Transport |
| | isoLAN/Analog signalling bridge |
| | isoLAN/Analog circuit bridge |
| | Tone detection |
| isoBridge Hub | Signalling Transport |
| | Circuit/Packet adaption bridge (for isoLAN to/from LAN) |
| 10 Base-T Hub | Packet Transport |
| | Packet/Cell adaption bridge (for LAN to/from backbone) |
| | Packet Switch or repeater (for desktop data) |
| ATM Hub | Cell Transport (for backbone) |
| | Cell Switch (for backbone) |
| Multimedia Manager | Signalling source/sink |
| | Connection manager |
| | QSIG Peer Signaller |
| | Feature manager |
| | Database |

More specifically with respect to FIGS. 6 and 7, the call flow diagrams delineate the distributed resource management of resources during the signalling process and circuit setup. For instance, the signalling bridge is performed by multimedia hub E 120E and the packet transport is executed by 10Base-T hub H 170H in multimedia hub signalling step 615. Thus the signalling between the desktop A 125A and multimedia manager M 190M is distributed within separate components in the network. The call flow diagrams are laden with many other examples of the distributed resource management.

Another important factor in a truly distributed network is that resources are commonly shared throughout the entire network. As a result, the architecture employs a shared resource management system as reflected in Table VIII.

TABLE VIII

Shared Resources

| Component | Resources |
| --- | --- |
| Multimedia Hub | Circuit/Cell adaption bridge (for isoLAN to/from backbone) |
| | Circuit Switch (for desktop voice/video) |
| | Packet Switch or repeater (for desktop data) (optional) |
| | Signalling bridge - In-band to/from Out-of-band (connection/feature management) |
| | Control bridge - Out-of-band to/from In-band (component management) |
| | Voice conference bridge |
| | Video conference bridge |
| | Voice/video record function |
| | Voice/video playback function |
| PRI Hub | Signalling Transport |
| | isoLAN/WAN signalling bridge |
| | isoLAN/WAN circuit bridge |
| Analog Hub | isoLAN/Analog signalling bridge |
| | Tone detection |
| isoBridge Hub | Circuit/Packet adaption bridge (for isoLAN to/from LAN) |
| 10 Base-T Hub | Packet/Cell adaption bridge (for LAN to/from backbone) |
| | Packet Switch or repeater (for desktop data) |
| ATM Hub | Cell Switch (for backbone) |
| Multimedia Manager | Signalling source/sink |
| | Connection manager |
| | QSIG Peer Signaller |
| | Feature manager |
| | Database |

More specifically with respect to FIGS. 6 and 7, the call flow diagrams delineate the shared resource management of resources during the signalling process and circuit setup. For instance, multimedia hub E 120E shares its signalling bridge resource with the desktop A 125A in multimedia hub signalling step 615. Stated another way, multimedia hub E 120E relinquishes control of its bridging resource to desktop A 125A in that circumstance. In another example, multimedia hub F 120F shares its signalling bridge resource with the multimedia manager M 190M in the second connection management step 625. Stated another way, multimedia hub F 120F relinquishes control of its bridging resource to multimedia manager M 190M in that circumstance. Therefore, the multimedia hub shares its bridging resource with multiple entities, namely the desktop and the multimedia manager in this case, in the network. Conversely, a desktop circuit transport is not considered a shared resource since it is owned by a single entity, in this case the multimedia hub, and provides connectivity to only one device (the desktop). The call flow diagrams are laden with many other examples of the shared resource management.

Another important factor in a truly distributed network is distributed call processing. The QSIG resource invoked by multimedia managers M and N 190M, 190N in the first connection management step 620 and the isochronous path step 635 of FIG. 6 illustrate distributed call processing. The connection itself will span resources that are managed by independent components, in this case multimedia managers L, M and N 190L, 190M, 190N. Therefore, not only is the connection signalling distributed, but the actual call processing component is distributed as well.

Figure 8:
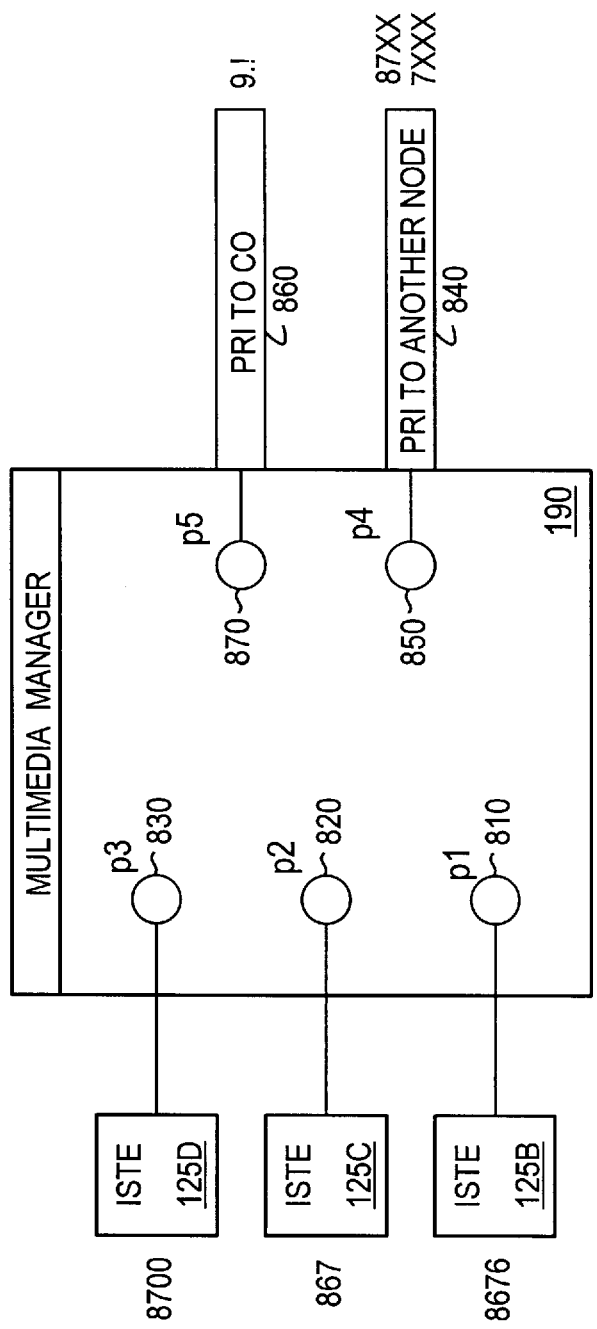
FIG. 8 illustrates a highly schematic representation of the multimedia manager subsystem of FIGS. 2A–CC for the purpose of showing an open dialing plan according to the present invention.

Turning now to FIG. 8, illustrated is a highly schematic representation of the multimedia manager subsystem of FIG. 2 for the purpose of showing an open dialing plan according to the present invention. The illustrated embodiment exhibits a first subordinate device 125B (with directory number 8676), a second subordinate device 125C (with directory number 867) and a third subordinate device 125D (with directory number 8700) are represented at a multimedia manager 190 at processes P1 810, P2 820 and P3 830, respectively. A private PRI span 840, represented at the multimedia manager 190 at process P4 850, accesses a private node where stations have directory numbers between 7000–7999 and 8700–8799. A public PRI span 860, represented at the multimedia manager 190 at process P5 870, accesses the public network. The multimedia manager 190 manages all of these devices.

The open dialing plan of the present invention provides a flexible, powerful method for associating treatments to directory numbers. By comparing sequences of dialed digits against a set of dialing patterns, it delivers appropriate call treatments to processes in charge of call delivery. Dialing patterns are assembled from one or more symbols chosen from a set including: digits 0–9, letters N, Y, X, the asterisk, the pound symbol, the exclamation point and the period. If every digit in a sequence of dialed digits maps to a symbol in the dialing pattern, the sequence of dialed digits is said to match the dialing pattern.

The symbols that comprise a dialing pattern fall into matching symbols and formatting symbols. Matching symbols are actively used in comparison between dialing patterns and sequences of dialed digits and fall into three classes. The first class is the matching symbols that match a specific dialed digit namely digits 0–9, the asterisk and the pound symbol. The second class is the matching symbols that match exactly one of a set of dialed digits including N (matches 0 and 1), Y (matches 2–9) and X (matches 0–9). The third class is matching symbols that match any number of dialed digits is the exclamation point. The formatting symbols provide information for interpreting the structure of the sequence of the dialed digits and include the period.

As previously mentioned, dialing patterns are associated with call treatments, though call treatments are not linked exclusively with dialing patterns. Call treatments and their associated data allow call control to properly process call attempts. The call treatments comprise dial, block and wait. Dial call treatment indicates that call control should extend the call to a destination The associated elements are the process I.D. of the entity and the directory of the dial destination less any prefix digits. Block call treatment indicates that call control should reject the call attempt. The associated data is the ISDN cause value that call control should use upon rejection. The wait call treatment indicates that the call control should request further digits from the user and reanalyze the sequence of dialed digits when it receives more digits or a digit timer expires.

The set of dialing patterns represents the set of all system-reachable destinations. To select the proper treatment when a sequence of dialed digits is matched by multiple dialing patterns, the open dialing plan uses a comparison scheme. In addition, the open dialing plan applies specific procedures for incomplete sequences of dialed digits and comparison failures. The comparison precedence scheme determines the restrictiveness of a dialing pattern by computing how many sequences of digits the same length as the sequence of dialed digits would match the dialing pattern. The open dialing plan then applies the call treatment associated with the most restrictive dialing pattern.

If there are incomplete sequences of dialed digits and the open dialing plan determines that appending further dialed information to the compared sequence of digits might match another dialing pattern, then it applies the wait call treatment. If there is a comparison failure and the open dialing plan determines that appending further dialed information to the compared sequence of digits would not match any dialing patterns, it applies the block call treatment. Finally, if the open dialing plan determines that the sequence of dialed digits matches at least one dialing pattern and that appending further dialed information to the compared sequence of digits might match other dialing pattern, then it applies the call treatment associated with the most restrictive matching dialing pattern.

FIG. 8 and Table IX, taken in conjunction, demonstrate how digit analysis uses dialing patterns to route calls. Table IX pertains to the dialing patterns associated with the respective processes. In addition it describes a call treatment for a vacant number.

TABLE IX

Dialing Pattern Representation

| Dialing Pattern | Action | Associated Process |
|---|---|---|
| 8676 | Dial | p1 |
| 867 | Dial | p2 |
| 8700 | Dial | p3 |
| 9.! | Dial | p4 |
| 87XX | Dial | p5 |
| 7XXX | Dial | p6 |
| 8927 | Block | Number Changed |

Table X describes what actions the open dialing plan takes in response to different sequences of dialed digits.

TABLE X

Call Treatments in Response to Digit Sequences

| Dialed Digits | Matched Patterns | Potential Matches | Action Taken |
|---|---|---|---|
| 86 | none | 867,8676 | Wait for further digits, If none arrive, block the call using cause #1, unassigned number. |
| 867 | 867 | 8676 | Wait for further digits. If none arrive, route the call to process p2 with called party number 867. |
| 8676 | 8676 | none | Route the call to process p1 with called party number 8676. |
| 870 | none | 8700, 87XX | Wait for further digits. If none arrive, block the call using cause #1, unassigned number. |
| 8702 | 87XX | none | Route the call to process p5 with called party number 8702. |
| 8700 | 8700, 87XX | none | Route the call to process p3 with called party number 8700 |
| 6000 | none | none | Block the call using cause #1, unassigned number. |
| 8927 | 8927 | none | Block the call using cause #22, number changed. |
| 912145551212 | 9.! | none | Route the call to process p4 with called party number 12145551212 |

Per Table X, the open dialing plan applies the call treatment to the dialed digits and attempts to route the calls based upon the potential matches. As a result, the open dialing plan provides a flexible method for associating treatments to directory numbers.

Figure 9:
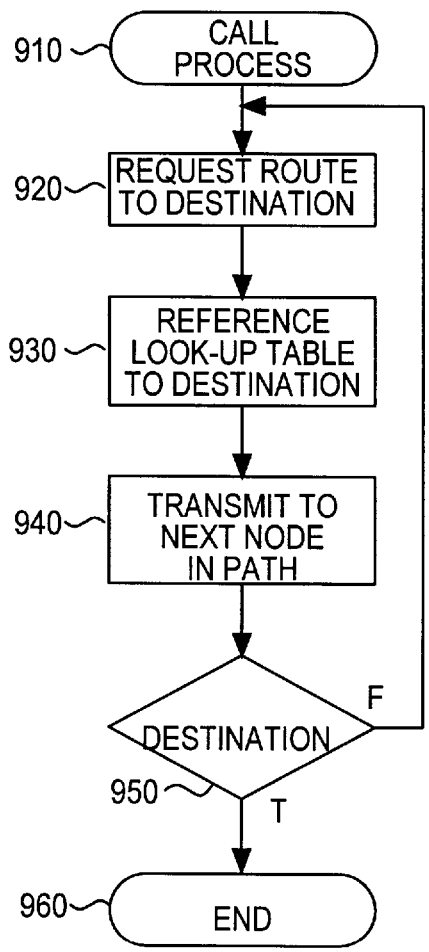
FIG. 9 illustrates a flow diagram of a shortest path call routing subsystem according to the present invention.

Turning now to FIG. 9, illustrated is a flow diagram of a shortest path call routing subsystem according to the present invention. The system of the present invention comprises a distributed network of nodes. A "node" is defined for the purposes of this embodiment to be the multimedia hubs 120 as controlled by the multimedia manager 190. Because the system is distributed, a call made within the system may need to traverse multiple nodes to reach its destination. As a result, the best route must be selected.

During the initialization phase of the multimedia manager 190, a table is constructed to establish the shortest path between interconnecting nodes under the control of the multimedia manager 190. The table is created by reading the interconnections between nodes, constructing paths between the nodes, calculating the corresponding shortest path between the nodes through a shortest path algorithm, and finally saving the shortest paths between nodes in the table in the multimedia manager 190. Therefore, the shortest paths between nodes are tabulated throughout the distributed network before the first transmission is attempted.

The shortest path call routing between two nodes in the network commences in a call processing step 910. The transmitting node, through the multimedia manager 190, will then request a path to the destination node in a request step 920. The multimedia manager 190 then reviews the shortest path table to decipher the shortest path to the destination node in a reference step 930. Upon receiving the shortest path, the transmitting node sends the information to the next node in the path in a transmit step 940. In a decisional step 950, the subsystem of the present invention determines if the information has reached its destination. If the information has only reached an intermediary node, then the process returns to a reference step 930 and then to the transmit step 940 to send the information to the next node. Otherwise, if the information has reached its destination, then the subsystem is exited at an end step 960.

From the above description, it is apparent that the present invention provides a multimedia system employing central and peripheral hubs under management of a server, or manager subsystem, the hubs and subsystem cooperate to serve requests originating in a plurality of clients coupled to the hubs. The client-server-client architecture allows for distributed processing and resource management. Redundant connections between the various network subsystems and hubs provide survivability. Each subsystem or hub is provided with the ability to initialize or recover from systemic errors, thereby distributing initialization and recovery. Certain of the distributed resources are capable of being managed from other subsystems, thereby allowing sharing of the resources. An open numbering plan allows efficient call treatment of dialed numbers. Call processing is sharable between multiple manager subsystems. Finally, an iterative process is employed to ensure that calls routed through the network travel the shortest possible path.

Although the present invention and its advantages have been described in detail, those skilled in the art should understand that they can make various changes, substitutions and alterations herein without departing from the spirit and scope of the invention in its broadest form.

What is claimed is:

1. A survivable communications network, comprising:
   first and second manager subsystems, said first and second manager subsystems having first and second equivalent manager subsystem resources associated therewith, respectively;
   first and second central hubs, each of said first and second central hubs having first and second equivalent central hub resources associated therewith, respectively;

a peripheral hub having peripheral hub resources associated therewith;

a common bus capable of coupling a selectable one of said first and second central hubs to a selectable one of said first and second manager subsystems, said first central hub thereby capable of decoupling from a failed one of said first and second manager subsystems and coupling instead to an operating one of said first and second manager subsystems, said second central hub thereby capable of decoupling from a failed one of said first and second manager subsystems and coupling instead to a functioning one of said first and second manager subsystems; and first and second redundant channels coupling said peripheral hub to said first and second central hubs, respectively, said peripheral hub thereby capable of decoupling from a failed one of said first and second central hubs and coupling instead to a functioning one of said first and second central hubs, said network thereby able to survive failure of a selected one of said first and second manager subsystems and a selected one of said first and second central hubs.

2. The communications network as recited in claim 1 further comprising a second common bus capable of coupling a selectable one of said first and second central hubs to a selectable one of said first and second manager subsystems, said network thereby able to survive failure of a selected one of said common and second common buses.

3. The communications network as recited in claim 1 wherein said first and second central hubs are each provided with a default manager subsystem designation controlling to which of said first and second manager subsystems said first and second central hubs initially couple.

4. The communications network as recited in claim 1 wherein said peripheral hub is provided with a default central hub designation controlling to which of said first and second central hubs said peripheral hub initially couples.

5. The communications network as recited in claim 1 wherein said first and second central hubs each have isochronous switching resources associated therewith, said isochronous switching resources capable of coupling a user information path between first and second client subsystems.

6. The communications network as recited in claim 1 further comprising an isochronous user information path coupled to said peripheral hub, said isochronous user information path adapted to carry multimedia information.

7. The communications network as recited in claim 1 further comprising a plurality of peripheral hubs coupled to a selected one of said first and second central hubs, each of said plurality of peripheral hubs having control of associated resources within said each of said plurality of peripheral hubs, a selected one of said first and second manager subsystems capable of generating a request to a selected one of said plurality of peripheral hubs for access to said resources associated with said selected one, said selected one granting said request only when said associated resources are available.

8. The communications network as recited in claim 1 wherein each of said first and second manager subsystems further has feature services resources associated therewith, said feature services resources selected from the group consisting of:

transfer, conference, hold, drop, record/playback, and numbering plan database.

9. The communications network as recited in claim 1 wherein each of said first and second manager subsystems further has connectivity services resources associated therewith, said connectivity services resources selected from the group consisting of:

point-to-point, point-to-multipoint, and multipoint-to-multipoint.

10. The communications network as recited in claim 1 wherein each of said first and second manager subsystems further has media services resources associated therewith, said media services resources selected from the group consisting of:

video encode/decode, video record/playback, voice encode/decode, voice record/playback, speech detection, and data encode/decode.

11. A method of providing redundancy in a survivable communications network, comprising the steps of:

providing first and second manager subsystems, said first and second manager subsystems having first and second equivalent manager subsystem resources associated therewith, respectively;

providing first and second central hubs, each of said first and second central hubs having first and second equivalent central hub resources associated therewith, respectively;

providing a peripheral hub having peripheral hub resources associated therewith;

selectively coupling a selectable one of said first and second central hubs to a selectable one of said first and second manager subsystems with a common bus, said first central hub thereby capable of decoupling from a failed one of said first and second manager subsystems and coupling instead to an operating one of said first and second manager subsystems, said second central hub thereby capable of decoupling from a failed one of said first and second manager subsystems and coupling instead to a functioning one of said first and second manager subsystems; and selectively coupling said peripheral hub to said first and second central hubs with first and second redundant channels, respectively, said peripheral hub thereby capable of decoupling from a failed one of said first and second central hubs and coupling instead to a functioning one of said first and second central hubs, said network thereby able to survive failure of a selected one of said first and second manager subsystems and a selected one of said first and second central hubs.

12. The method as recited in claim 11 further comprising the step of coupling a selectable one of said first and second central hubs to a selectable one of said first and second manager subsystems with a second common bus, said network thereby able to survive failure of a selected one of said common and second common buses.

13. The method as recited in claim 11 further comprising the step of controlling, with a default manager subsystem designation provided in each of said first and second central hubs, to which of said first and second manager subsystems said first and second central hubs initially couple.

14. The method as recited in claim 11 further comprising the step of controlling, with a default central hub designation provided in said peripheral hub, to which of said first and second central hubs said peripheral hub initially couples.

15. The method as recited in claim 11 wherein said first and second central hubs each have isochronous switching resources associated therewith, said method further comprising the step of coupling a user information path between first and second client subsystems with said isochronous switching resources.

16. The method as recited in claim 11 further comprising an isochronous user information path coupled to said peripheral hub, said method further comprising the step of carrying multimedia information over said isochronous user information path.

17. The method as recited in claim 11 further comprising the step of selectively coupling a plurality of peripheral hubs to a selected one of said first and second central hubs, each of said plurality of peripheral hubs having control of associated resources within said each of said plurality of peripheral hubs, a selected one of said first and second manager subsystems capable of generating a request to a selected one of said plurality of peripheral hubs for access to said resources associated with said selected one, said selected one granting said request only when said associated resources are available.

18. The method as recited in claim 11 wherein each of said first and second manager subsystems further has feature services resources associated therewith, said method further comprising the step of accessing said feature services resources selected from the group consisting of:

transfer, conference, hold, drop, record/playback, and numbering plan database.

19. The method as recited in claim 11 wherein each of said first and second manager subsystems further has connectivity services resources associated therewith, said method further comprising the step of accessing said connectivity services resources selected from the group consisting of:

point-to-point, point-to-multipoint, and multipoint-to-multipoint.

20. The method as recited in claim 11 wherein each of said first and second manager subsystems further has media services resources associated therewith, said method further comprising the step of accessing said media services resources selected from the group consisting of:

video encode/decode, video record/playback, voice encode/decode, voice record/playback, speech detection, and data encode/decode.

21. A decentralized communications network, comprising:

a first subsystem having first resources associated therewith; and a second subsystem, coupled to said first subsystem and a client device via corresponding ports, said second subsystem having second resources associated therewith and circuitry adapted to execute a second initialization and recovery procedure, said second initialization and recovery procedure initializing components within said second subsystem, testing a functioning of said corresponding ports and placing said second subsystem in an operational condition to make said second resources available to said client device.

22. The communications network as recited in claim 21 wherein said second subsystem is capable of notifying said first subsystem of said operational condition.

23. The communications network as recited in claim 21 wherein said first subsystem further has circuitry adapted to execute a first initialization and recovery procedure, said first initialization and recovery procedure initializing components within said first subsystem, testing a functioning of a port coupling said first subsystem to said second subsystem and placing said first subsystem in an operational condition to make said first resources available to said second subsystem.

24. The communications network as recited in claim 21 wherein said first subsystem is a manager subsystem and said second subsystem is a central hub.

25. The communications network as recited in claim 21 wherein said first subsystem is a central hub and said second subsystem is a peripheral hub.

26. The communications network as recited in claim 21 wherein said first and second subsystems each contain independent data processing circuitry adapted to execute said first and second initialization and recovery procedures independently.

27. The communications network as recited in claim 21 wherein said second hub has isochronous switching resources associated therewith, said isochronous switching resources capable of coupling a user information path between said client device and a second client device.

28. The communications network as recited in claim 21 wherein said first subsystem further has feature services resources associated therewith, said feature services resources selected from the group consisting of:

transfer, conference, hold, drop, record/playback, and numbering plan database.

29. The communications network as recited in claim 21 wherein said first subsystem further has connectivity services resources associated therewith, said connectivity services resources selected from the group consisting of:

point-to-point, point-to-multipoint, and multipoint-to-multipoint.

30. The communications network as recited in claim 21 wherein said first subsystem further has media services resources associated therewith, said media services resources selected from the group consisting of:

video encode/decode, video record/playback, voice encode/decode, voice record/playback, speech detection, and data encode/decode.

31. A method of initializing and recovering subsystems in a decentralized communications network, said network including a first subsystem having first resources associated therewith and a second subsystem, coupled to said first subsystem and a client device via corresponding ports, said second subsystem having second resources associated therewith, the method comprising the steps of:

executing a second initialization and recovery procedure in said second subsystem, said second initialization and recovery procedure:

initializing components within said second subsystem, testing a functioning of said corresponding ports, and placing said second subsystem in an operational condition to make said second resources available to said client device.

32. The method as recited in claim 31 further comprising the step of notifying said first subsystem of said operational condition.

33. The method as recited in claim 31 wherein said first subsystem further has circuitry adapted to execute a first initialization and recovery procedure, said method further comprising the steps of initializing components within said first subsystem, testing a functioning of a port coupling said first subsystem to said second subsystem and placing said first subsystem in an operational condition to make said first resources available to said second subsystem with said first initialization and recovery procedure.

34. The method as recited in claim 31 wherein said first subsystem is a manager subsystem and said second subsystem is a central hub.

35. The method as recited in claim 31 wherein said first subsystem is a central hub and said second subsystem is a peripheral hub.

36. The method as recited in claim 31 wherein said first and second subsystems each contain independent data processing circuitry adapted to execute said first and second initialization and recovery procedures independently.

37. The method as recited in claim 31 wherein said second hub has isochronous switching resources associated therewith, said method further comprising the step of coupling a user information path between said client device and a second client device with said isochronous switching resources.

38. The method as recited in claim 31 wherein said first subsystem further has feature services resources associated therewith, said method further comprising the step of accessing said feature services resources selected from the group consisting of:

transfer, conference, hold, drop, record/playback, and numbering plan database.

39. The method as recited in claim 31 wherein said first subsystem further has connectivity services resources associated therewith, said method further comprising the step of accessing said connectivity services resources selected from the group consisting of:

point-to-point, point-to-multipoint, and multipoint-to-multipoint.

40. The method as recited in claim 31 wherein said first subsystem further has media services resources associated therewith, said method further comprising the step of accessing said media services resources selected from the group consisting of:

video encode/decode, video record/playback, voice encode/decode, voice record/playback, speech detection, and data encode/decode.

41. A communications network, comprising:

first and second manager subsystems having associated first and second call processing resources, respectively; and a first device coupled to said first manager subsystem and capable of obtaining access to said first call processing services of said first manager subsystem to initiate a call to a second device coupled to said second manager subsystem, said first manager subsystem creating a process for completing said call, said first manager subsystem communicating said process to second manager subsystem to create said process in said second manager subsystem, said first and second manager subsystems cooperating to provide call processing services to attempt to complete said call from said first device to said second device, said call processing services thereby distributed between said first and second manager subsystems.

42. The communications network as recited in claim 41 wherein a first signalling channel couples said first device to said first manager subsystem and a second signalling channel couples said second device to said second manager subsystem, said first signalling channel allowing said first device to generate a request to said first manager subsystem for access to said call processing resources of said first manager subsystem, said first manager subsystem granting said request only when said call processing resources are available, said first manager subsystem capable of employing said call processing resources to initiate said call.

43. The communications network as recited in claim 41 wherein an isochronous user information path is capable of being coupled between said first and second devices to convey said call between said first and second devices.

44. The communications network as recited in claim 41 wherein a single replicated object-oriented database provides an environment for creating and communicating said process, coupling distributed call processing elements into an apparent single network whole.

45. The communications network as recited in claim 41 wherein said first and second manager subsystems communicate across a private network partition.

46. The communications network as recited in claim 41 wherein said first device is capable of initiating a multimedia call through said communications network.

47. The communications network as recited in claim 41 wherein said first manager subsystem comprises a sequence of instructions executable in a general purpose computer system.

48. The communications network as recited in claim 41 wherein said first manager subsystem further has feature services resources associated therewith, said feature services resources selected from the group consisting of:

transfer, conference, hold, drop, record/playback, and numbering plan database.

49. The communications network as recited in claim 41 wherein said first manager subsystem further has connectivity services resources associated therewith, said connectivity services resources selected from the group consisting of:
- point-to-point,
- point-to-multipoint, and
- multipoint-to-multipoint.

50. The communications network as recited in claim 41 wherein said first manager subsystem further has media services resources associated therewith, said media services resources selected from the group consisting of:
- video encode/decode,
- video record/playback,
- voice encode/decode,
- voice record/playback,
- speech detection, and
- data encode/decode.

51. A method of processing a call in a communications network, comprising the steps of:
- providing first and second manager subsystems having associated first and second call processing resources, respectively;
- initiating a call, from a first device coupled to said first manager subsystem and capable of obtaining access to said first call processing services of said first manager subsystem, to a second device coupled to said second manager subsystem;
- creating a process in said first manager subsystem for completing said call; and
- communicating said process from said first manager subsystem to second manager subsystem to create said process in said second manager subsystem, said first and second manager subsystems cooperating to provide call processing services to attempt to complete said call from said first device to said second device, said call processing services thereby distributed between said first and second manager subsystems.

52. The method as recited in claim 51 wherein a first signalling channel couples said first device to said first manager subsystem and a second signalling channel couples said second device to said second manager subsystem, said method further comprising the steps of:
- allowing said first device to generate a request to said first manager subsystem for access to said call processing resources of said first manager subsystem; and
- granting said request only when said call processing resources are available, said first manager subsystem capable of employing said call processing resources to initiate said call.

53. The method as recited in claim 51 further comprising the step of coupling an isochronous user information path between said first and second devices to convey said call between said first and second devices.

54. The method as recited in claim 51 wherein a single replicated object-oriented database provides an environment for creating and communicating said process, coupling distributed call processing elements into an apparent single network whole.

55. The method as recited in claim 51 further comprising the step of communicating across a private network partition with said first and second manager subsystems.

56. The method as recited in claim 51 further comprising the step of initiating a multimedia call with said first device.

57. The method as recited in claim 51 wherein said method is performed, in part, by executing a sequence of instructions in a general purpose computer system.

58. The method as recited in claim 51 wherein said first manager subsystem further has feature services resources associated therewith, said method further comprising the step of accessing said feature services resources selected from the group consisting of:
- transfer,
- conference,
- hold,
- drop,
- record/playback, and
- numbering plan database.

59. The method as recited in claim 51 wherein said first manager subsystem further has connectivity services resources associated therewith, said method further comprising the step of accessing said connectivity services resources selected from the group consisting of:
- point-to-point,
- point-to-multipoint, and
- multipoint-to-multipoint.

60. The method as recited in claim 51 wherein said first manager subsystem further has media services resources associated therewith, said method further comprising the step of accessing said media services resources selected from the group consisting of:
- video encode/decode,
- video record/playback,
- voice encode/decode,
- voice record/playback,
- speech detection, and
- data encode/decode.

61. In a communications network having a plurality of distributed nodes coupled together by a web of synchronous communication path segments having substantially equivalent transmission delays associated therewith, a system for routing a call from a source node to a destination node along a shortest path through said communications network, comprising:
- a first intermediate node for receiving a request from said source node for a path across said communications network to said destination node, said first intermediate node retrieving first data from a first intermediate database associated with said first intermediate node, said first data representing said shortest path, and forwarding said request through said communications network as a function of said first data; and
- a subsequent intermediate node for receiving said request from said first intermediate node for said path across said communications network to said destination node, said subsequent intermediate node retrieving subsequent data from a subsequent intermediate database associated with said subsequent intermediate node, said subsequent data representing said shortest path, and forwarding said request through said communications network as a function of said data.

62. The system as recited in claim 61 wherein said first and intermediate data are created during an initialization of said communications network.

63. The system as recited in claim 61 wherein an isochronous user information path is capable of being coupled between said source and destination nodes to convey information between said first and second nodes.

64. The system as recited in claim 61 wherein said first and subsequent intermediate databases are replications of a single object-oriented database.

65. The system as recited in claim 61 wherein said first and subsequent intermediate nodes communicate across a private network partition.

66. The system as recited in claim 61 wherein said source node is capable of initiating a multimedia call through said communications network.

67. The system as recited in claim 61 wherein said first intermediate node comprises a sequence of instructions executable in a general purpose computer system.

68. The system as recited in claim 61 wherein said first intermediate node further has feature services resources associated therewith, said feature services resources selected from the group consisting of:

transfer, conference, hold, drop, record/playback, and numbering plan database.

69. The system as recited in claim 61 wherein said first intermediate node further has connectivity services resources associated therewith, said connectivity services resources selected from the group consisting of:

point-to-point, point-to-multipoint, and multipoint-to-multipoint.

70. The system as recited in claim 61 wherein said first intermediate node further has media services resources associated therewith, said media services resources selected from the group consisting of:

video encode/decode, video record/playback, voice encode/decode, voice record/playback, speech detection, and data encode/decode.

71. In a communications network having a plurality of distributed nodes coupled together by a web of synchronous communication path segments having substantially equivalent transmission delays associated therewith, a method of routing a call from a source node to a destination node along a shortest path through said communications network, comprising the steps of:

receiving a request from said source node into a first intermediate node for a path across said communications network to said destination node, said first intermediate node retrieving first data from a first intermediate database associated with said first intermediate node, said first data representing said shortest path, and forwarding said request through said communications network as a function of said first data; and receiving said request from said first intermediate node into a subsequent intermediate node for said path across said communications network to said destination node, said subsequent intermediate node retrieving subsequent data from a subsequent intermediate database associated with said subsequent intermediate node, said subsequent data representing said shortest path, and forwarding said request through said communications network as a function of said data.

72. The method as recited in claim 71 further comprising the step of creating said first and intermediate data during an initialization of said communications network.

73. The method as recited in claim 71 further comprising the step of coupling an isochronous user information path between said source and destination nodes to convey information between said first and second node.

74. The method as recited in claim 71 wherein said first and subsequent intermediate databases are replications of a single object-oriented database.

75. The method as recited in claim 71 wherein said first and subsequent intermediate nodes communicate across a private network partition.

76. The method as recited in claim 71 further comprising the step of initiating a multimedia call through said communications network with said source node.

77. The method as recited in claim 71 wherein said method is performed, in part, by executing a sequence of instructions in a general purpose computer system.

78. The method as recited in claim 71 wherein said first intermediate node further has feature services resources associated therewith, said method further comprising the step of accessing said feature services resources selected from the group consisting of:

transfer, conference, hold, drop, record/playback, and numbering plan database.

79. The method as recited in claim 71 wherein said first intermediate node further has connectivity services resources associated therewith, said method further comprising the step of accessing said connectivity services resources selected from the group consisting of:

point-to-point, point-to-multipoint, and multipoint-to-multipoint.

80. The method as recited in claim 71 wherein said first intermediate node further has media services resources associated therewith, said method further comprising the step of accessing said media services resources selected from the group consisting of:

video encode/decode, video record/playback, voice encode/decode, voice record/playback, speech detection, and data encode/decode.

81. A communications network, comprising:

first and second client subsystems;

a server subsystem having transport resources associated therewith;

a plurality of hubs coupled to said server subsystem, each of said plurality of hubs having control of associated resources within said each of said plurality of hubs, said server subsystem capable of generating a request to a selected one of said plurality of hubs for access to said resources associated with said selected one, said selected one granting said request only when said associated resources are available;

a first signalling channel coupling said first client subsystem to said server subsystem and a second signalling channel coupling said second client subsystem to said server subsystem, said first signalling channel allowing said first client subsystem to generate a request to said server subsystem for access to said transport resources of said server subsystem, said server subsystem granting said request only when said transport resources are available, said server subsystem capable of employing said transport resources to initiate a call between said first and second client subsystems; and an isochronous user information path capable of being coupled between said first and second client subsystems to convey said call between said first and second client subsystems.

82. The communications network as recited in claim 81 wherein one of said plurality of hubs has isochronous switching resources associated therewith, said isochronous switching resources capable of coupling said user information path between said first and second client subsystems, said server subsystem generating a request to said hub for access to said isochronous switching resource of said hub, said hub granting said request only when said isochronous switching resources are available.

83. The communications network as recited in claim 81 wherein said isochronous user information path is adapted to carry multimedia information.

84. The communications network as recited in claim 81 wherein said second signalling channel passes through a second server subsystem associated with said second client subsystem.

85. The communications network as recited in claim 81 wherein said first client subsystem is capable of initiating a multimedia call through said communications network.

86. The communications network as recited in claim 81 wherein said server subsystem comprises a sequence of instructions executable in a general purpose computer system.

87. The communications network as recited in claim 81 wherein said server subsystem further has feature services resources associated therewith, said feature services resources selected from the group consisting of:
 transfer,
 conference,
 hold,
 drop,
 record/playback, and
 numbering plan database.

88. The communications network as recited in claim 81 wherein said server subsystem further has connectivity services resources associated therewith, said connectivity services resources selected from the group consisting of:
 point-to-point,
 point-to-multipoint, and
 multipoint-to-multipoint.

89. The communications network as recited in claim 81 wherein said server subsystem further has media services resources associated therewith, said media services resources selected from the group consisting of:
 video encode/decode,
 video record/playback,
 voice encode/decode,
 voice record/playback,
 speech detection, and
 data encode/decode.

90. A method of establishing a call in a communications network, comprising the steps of:
 coupling first and second client subsystems to a server subsystem, having transport resources associated therewith, through first and second signalling channels, respectively;
 coupling a plurality of hubs to said server subsystem, each of said plurality of hubs having control of associated resources within said each of said plurality of hubs, said server subsystem capable of generating a request to a selected one of said plurality of hubs for access to said resources associated with said selected one, said selected one granting said request only when said associated resources are available;
 generating a request from said first client subsystem to said server subsystem and allowing said first client subsystem access to transport resources associated with said server subsystem, said server subsystem granting said request only when said transport resources are available, said server subsystem capable of employing said transport resources to initiate a call between said first client subsystem and said second client subsystem; and
 coupling an isochronous user information path between said first and second client subsystems to convey said call between said first and second client subsystems.

91. The method as recited in claim 90 wherein one of said plurality of hubs has isochronous switching resources associated therewith, said method further comprising the step of coupling said user information path between said first and second client subsystems with said isochronous switching resources, said server subsystem generating a request to said hub for access to said isochronous switching resource of said hub, said hub granting said request only when said isochronous switching resources are available.

92. The method as recited in claim 90 further comprising the step of carrying multimedia information over said isochronous user information path.

93. The method as recited in claim 90 wherein said second signalling channel passes through a second server subsystem associated with said second client subsystem.

94. The method as recited in claim 90 further comprising the step of initiating a multimedia call through said communications network with said first client subsystem.

95. The method as recited in claim 90 wherein said method is performed, in part, by executing a sequence of instructions in a general purpose computer system.

96. The method as recited in claim 90 wherein said server subsystem further has feature services resources associated therewith, said method further comprising the step of accessing said feature services resources selected from the group consisting of:
 transfer,
 conference,
 hold,
 drop,
 record/playback, and
 numbering plan database.

97. The method as recited in claim 90 wherein said server subsystem further has connectivity services resources associated therewith, said method further comprising the step of accessing said connectivity services resources selected from the group consisting of:
 point-to-point,
 point-to-multipoint, and
 multipoint-to-multipoint.

98. The method as recited in claim 90 wherein said server subsystem further has media services resources associated therewith, said method further comprising the step of accessing said media services resources selected from the group consisting of:
 video encode/decode,
 video record/playback,
 voice encode/decode,
 voice record/playback,
 speech detection, and
 data encode/decode.

* * * * *